(12) United States Patent
Wako et al.

(10) Patent No.: US 6,703,568 B2
(45) Date of Patent: Mar. 9, 2004

(54) COMBINATION WEIGHING APPARATUS HAVING A WEIGHING DEVICE BASE, TO WHICH A PLURALITY OF WEIGHING DEVICES ARE FIXED, THAT IS DIRECTLY FIXED TO A STAND

(75) Inventors: Kazuyoshi Wako, Atsugi (JP); Osamu Tanaka, Atsugi (JP); Eiji Asai, Atsugi (JP)

(73) Assignee: Anritsu Corporation, Tokyo (JP)

( * ) Notice: Subject to any disclaimer, the term of this patent is extended or adjusted under 35 U.S.C. 154(b) by 200 days.

(21) Appl. No.: 09/958,553

(22) PCT Filed: May 18, 2001

(86) PCT No.: PCT/JP01/04164
§ 371 (c)(1),
(2), (4) Date: Oct. 9, 2001

(87) PCT Pub. No.: WO01/88491
PCT Pub. Date: Nov. 22, 2001

(65) Prior Publication Data
US 2002/0157874 A1 Oct. 31, 2002

(30) Foreign Application Priority Data
May 19, 2000 (JP) .......................................... 2000-148922
Sep. 1, 2000 (JP) .......................................... 2000-265288

(51) Int. Cl.⁷ ........................ G01G 19/387; G01G 21/28
(52) U.S. Cl. ..................... 177/25.18; 177/180; 177/238; 177/244
(58) Field of Search ............................. 177/25.18, 180, 177/238, 244

(56) References Cited

U.S. PATENT DOCUMENTS

| | | | |
|---|---|---|---|
| 4,398,614 A | * 8/1983 | Kakita et al. | 177/25.18 |
| 4,548,287 A | 10/1985 | Matsuura | 177/25.18 |
| 4,560,015 A | * 12/1985 | Minamida | 177/25.18 |
| RE32,276 E | * 11/1986 | Kakita et al. | 177/25.18 |
| 4,871,038 A | * 10/1989 | Isherwood et al. | 177/25.18 |
| 5,621,194 A | * 4/1997 | Koyama et al. | 177/25.18 |
| 5,765,655 A | * 6/1998 | Tatsuoka | 177/25.18 |
| 6,188,029 B1 | 2/2001 | Miyamoto et al. | 177/105 |
| 6,365,845 B1 | * 4/2002 | Pearce | 177/25.18 |

FOREIGN PATENT DOCUMENTS

| | | |
|---|---|---|
| EP | 852 328 A1 | 7/1998 |
| EP | 0852328 A | 7/1998 |
| JP | 59-141018 A | 8/1984 |

\* cited by examiner

*Primary Examiner*—Randy Gibson
(74) *Attorney, Agent, or Firm*—Frishauf, Holtz, Goodman & Chick, P.C.

(57) ABSTRACT

In a combination weighing apparatus, a plurality of feeders supply a subject to be weighed. A plurality of weighing hoppers receive the subject to be weighed which is supplied by a plurality of feeders. A plurality of weighing devices weigh the subject to be weighed which is received in each of the weighing hoppers. A plurality of weighing devices are fixed to the weighing base. Stands are provided in a circumferential direction at a predetermined interval, the stands respectively have leg portions standing up from a placing surface and supporting portions including horizontal portions connected to the leg portions, and the horizontal portions of the supporting portions are constituted by a plurality of metal supporting columns connected to each other in center portions. The weighing base is directly fixed to a lower surface of the center connecting portions of the stands.

20 Claims, 18 Drawing Sheets

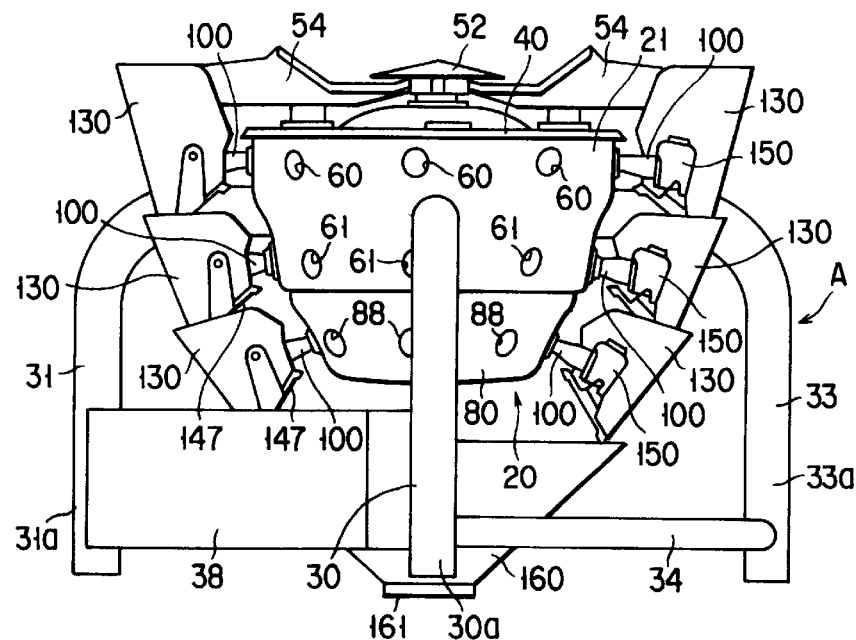
FIG. 1A
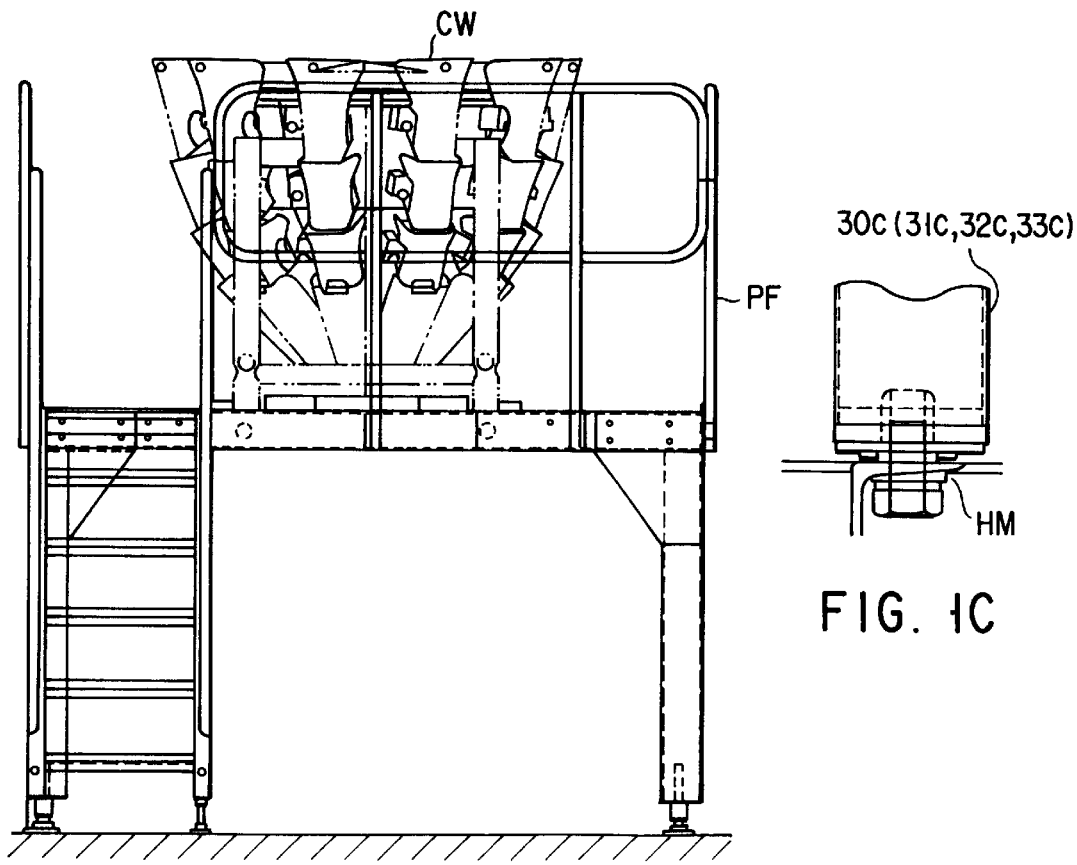
FIG. 1B
FIG. 1C

COMBINATION WEIGHING APPARATUS HAVING A WEIGHING DEVICE BASE, TO WHICH A PLURALITY OF WEIGHING DEVICES ARE FIXED, THAT IS DIRECTLY FIXED TO A STAND

This application is a U.S. National Phase Application under 35 USC 371 of International Application PCT/JP01/04164 (not published in English) filed May 18, 2001.

TECHNICAL FIELD

The present invention related to a combination weighing apparatus, and more particularly to a combination weighting apparatus structured such that a weighing accuracy with respect to a subject to be weighed is not affected by internal and external vibrations, and to a vibration sensor that compensates for the influence of the vibrations, obtainable at low cost and without an increase in overall weight of the apparatus.

Further, the present invention relates to a combination weighing apparatus, and more particularly to a combination weighing apparatus structured such that the subject to be weighed and fine powder thereof hardly attach thereto, and maintenance and cleaning operations can be easily carried out during normal operations.

BACKGROUND ART

As is well known, conventionally, a combination weighing apparatus is employed for bagging foods, that is, goods individually having uneven mass, for example, potato chips, peanuts, fruit, sausages and the like at a predetermined mass or a substantially predetermined mass.

In this kind of combination weighing apparatus, for example, a plurality of radial feeders are radially provided around a center dispersing table, a plurality of stock hoppers, a plurality of weighing hoppers and the like are vertically arranged respectively below a front end of each of the radial feeders, and a collecting chute is provided below each of the stock hoppers, each of the weighing hoppers and the like.

Further, in the combination weighing apparatus mentioned above, for example, the subjects to be weighed such as food or the like as mentioned above are supplied to the dispersing table by a conveyor or the like, and dropped down into each of the stock hoppers by a plurality of radial feeders, and are then dropped down into each of the weighing hoppers by the downward action of the stock hoppers. Further, the subjects are weighed at each of the weighing hoppers.

In this case, the combined mass of all the subjects in the plurality of weighing hoppers is calculated by a calculating portion (not shown), whereby a predetermined mass or a combination close thereto is selected, and thereafter, the subjects are dropped down and discharged to a collecting chute from each of the weighing hoppers so as to be collected there.

Then, the weighed subjects are dropped down to the collecting chute so as to be gathered together and are conveyed out to the next process, such as a packaging process or the like.

Accordingly, in the conventional combination weighing apparatus having the structure mentioned above, for example, as shown in FIG. 34, a hollow polygonal tube shaped casing 2 is fixed on a stand 1.

Further, a dispersion table 3 is provided above the casing 2, and a collecting chute 5 is provided below the casing 2.

Further, a number of feeders 4, 4, . . . are radially provided above the casing 2 and around the dispersion table 3.

Further, a number of stock hoppers 6, 6, . . . are provided in a circumferential direction along an upper portion of a side wall 2a in the casing 2, and weighing hoppers 7, 7, . . . and memory hoppers 8, 8, . . . corresponding to lower portions of the respective stock hoppers 5 are provided in upper and lower portions, respectively.

Further, fixed ends of respective weighing devices 10, 10, . . . for the weighing hoppers 7, 7, . . . in the middle of the stock hoppers 6, 6, . . . and the memory hoppers 8, 8, . . . are fixed to respective weighing device bases 11, 11, . . . fixed to an inner surface of the side wall 2a of the casing 2.

Further, respective supporting bodies 12, 12, . . . fixed to free ends of the respective weighing devices 10, 10, . . . are protruded outward from respective holes 13, 13, . . . .

The weighing hoppers 7, 7, . . . are supported by front ends of the respective supporting bodies 12, 12, . . . , respectively.

A feeder base 15 is fixed to the above within the side wall 2a of the casing 2.

A number of vibrating devices 16, 16, . . . are fixed to an upper surface of the feeder base 15.

Respective vibration shafts 16a, 16a, . . . of the vibrating devices 16, 16, . . . are respectively protruded upward from holes 17, 17, . . . of an upper wall 2b in the casing 2.

The feeders 4, 4, . . . are respectively fixed to upper ends of the respective vibration shafts 16a, 16a, . . . .

That is, the respective feeders 4, 4, . . . are vibrated due to vibrations transmitted from the respective vibration shafts 16a, 16a, . . . of the vibrating devices 16, 16, . . . and the subjects to be weighed on the respective feeders 4, 4, . . . are dropped down to the respective stock hoppers 6, 6, . . . .

However, in the conventional combination weighing apparatus having the structure mentioned above, since the respective weighing device bases 11, 11, . . . are provided between the feeder base 15 fixed to the upper portion of the hollow polygonal tube shaped casing 2 fixed on the stand 1 and the stand 1, the respective weighing devices 10, 10, . . . are little affected by the vibration of the respective vibrating devices 16, 16, . . . , leading to a disadvantage that a weighing accuracy with respect to the subject to be weighed is deteriorated.

Further, since the respective weighing device bases 11, 11, . . . are mounted to the side wall 2a of the hollow casing 2 at every weighing devices 10, 10, . . . , a stable operation of the respective weighing devices 10, 10, . . . depends upon a rigidity of the casing 2, so that it is necessary to firmly form the casing 2 at that degree for stabilizing the weighing operation, whereby there is a disadvantage that the weight is increased as a whole of the apparatus.

Further, it is necessary to provide a vibration sensor for compensating for the effects of the external vibration in the installing place of the stand 1, however, in the conventional apparatus shown in FIG. 34, since the respective weighing device bases 11, 11, . . . are provided in every weighing device 10, 10, . . . , it is necessary to mount the vibration sensors (not shown) to every weighing device base 11, 11, . . . , which is a disadvantageous as the cost is increased.

Further, as the conventional combination weighing apparatus, there has been known an apparatus structured as shown in FIG. 35.

That is, in this combination weighing apparatus, the dispersion table 3 and a number of radial feeders 4, 4, . . . are provided above the casing 2 provided in a center, and the collecting chute 4 is provided below the casing 2.

Further, a number of stock hoppers 6, 6, ... are provided in a circumferential direction along the outer periphery of the casing 2, and the corresponding weighing hoppers 7, 7, ... and memory hoppers 8, 8, ... are respectively provided in the upper and lower portions below the respective stock hoppers 6, 6, ....

Further, in the conventional art, the casing 2 is, as shown in FIG. 35, formed in a hollow polygonal column shape having a corresponding number of flat side walls 2a to the number of the hoppers arranged in the circumferential direction.

A rectangular window 18 is provided in each of the side walls 2a of the casing 2.

Further, a rectangular flat mounting plate 19 is detachably fixed from an outer side of each of the side walls 2a in the polygonal casing 2, thereby closing the window 18.

Further, the respective hoppers 6, 7 and 8 are vertically mounted to outer sides of the respective mounting plates 19, and a motor M corresponding to a drive source for opening and closing an opening and closing lid (not shown) of discharge ports in the respective hoppers 6, 7 and 8 is vertically mounted inside the mounting plates 19 at every hopper 6, 7 and 8.

A weighing device W for the weighing hopper 7 is mounted inside the mounting plate 19, and the structure is made such that a lever for driving the opening and closing lid driven by the motor M and the like are protruded outward from a hole (not shown) provided in the mounting plate 19 in correspondence to the respective hoppers 6, 7 and 8.

Further, at a time of inspecting and maintaining the motor M and the weighing device W and the like, the motor M and the weighing device W are drawn outward together with the mounting plate 19 by taking out the mounting plate 19 detachably fixed to each of the side walls 2a of the casing 2.

Accordingly, in the case that the subject to be weighed is particularly a food, in the combination weighing apparatus mentioned above in which the opening and closing lid is opened and closed at a significantly high speed, and the subject to be weighed is violently dropped and discharged, there is a risk that the fine powder of the subject to be weighed which is supplied and dropped down gradually attaches and accumulates on the whole of the combination weighing apparatus such as the hoppers, the casing and the like during continued use, so as to be an obstacle, or bacteria breed on the subject to be weighed which is attached and accumulated in the respective portions or the subject to be weighed is spoilt.

Accordingly, it is necessary to frequently clean the whole combination weighing apparatus in accordance with a water cleaning or the like.

Accordingly, as mentioned above, in the conventional combination weighing apparatus, as shown in FIG. 35, the large window 18 is required for taking the motor M and the weighing device W corresponding to three kinds of vertically disposed hoppers 6, 7 and 8 in and out the side wall 2a of the casing 2.

Further, since the structure is made such as to be covered by the mounting plate 19 for closing the window 18 from the outer side, the subject to be weighed is easily attached to and accumulated in the contact portion between the outer peripheral end surface of the mounting plate 19 and the side wall 2a, and the bacteria easily breed on the attached and accumulated subject to be weighed and the subject to be weighed is easily spoilt.

Further, as mentioned above, in the conventional combination weighing apparatus, due to the complex structure, there is a risk that it is hard to clean and a food sanitation is deteriorated, so that it is significantly inconvenient. Further, at a time of water cleaning, the water easily enters within the window 18 through the portion between the outer peripheral end surface of the mounting plate 19 and the side wall 2a, and there is a risk that the internal motor M and the weighing device W cannot be used.

Further, since it is necessary to remove the motor M and the weighing device W together with the mounting plate 19 by removing the mounting plate 19 in the manner mentioned above at a time of inspection or maintenance the motor M and the weighing device W within the casing 2, the operation is very troublesome.

DISCLOSURE OF INVENTION

An object of the present invention is to provide a combination weighing apparatus which solves the problems mentioned above and is particularly structured such that a weighing accuracy with respect to a subject to be weighed is not affected by internal and external vibrations, without increasing a mass of the apparatus as a whole, and a vibration sensor for compensating an influence due to the external vibration can be obtained at a low cost.

Further, another object of the present invention is to provide a combination weighing apparatus which solves the problems mentioned above and is particularly structured such that the subject to be weighed and fine powder thereof rarely attach thereto, and maintenance and cleaning operations can be easily carried out.

(1) In accordance with a first aspect of the present invention, in order to achieve the object mentioned above, there is provided a combination weighing apparatus comprising:

a plurality of feeders supplying a subject to be weighed;

a plurality of weighing hoppers receiving the subject to be weighed which is supplied by the plurality of feeders;

a plurality of weighing devices for weighing the subject to be weighed which is received in the weighing hoppers;

a weighing device base to which the plurality of weighing devices are fixed; and a stand constituted by a plurality of metal supporting columns provided at a predetermined interval in a circumferential direction, having leg portions standing up from placing surfaces and supporting portions including horizontal portions connected to the leg portions and the horizontal portions of the supporting portions being connected to each other at a center portion, wherein the weighing device base is directly fixed to a lower surface of the center connection portion of the stand.

(2) Further, in accordance with a second aspect of the present invention, in order to achieve the object mentioned above, there is provided a combination weighing apparatus as recited in the first aspect, wherein the weighing device base is a hollow tube body, the plurality of weighing devices are fixed to an outer peripheral portion of the hollow tube body, and a wiring path for the plurality of weighing devices is provided in an inner portion of the hollow tube body.

(3) Further, in accordance with a third aspect of the present invention, in order to achieve the object mentioned above, there is provided a combination weighing apparatus as recited in the first aspect, wherein a vibration sensor commonly used for compensating for the vibrations of the plurality of weighing devices is mounted to the weighing device base.

(4) Further, in accordance with a fourth aspect of the present invention, in order to achieve the object mentioned above, there is provided a combination weighing apparatus as recited in the first aspect, further comprising a side surface cover integrally formed so as to surround the weighing device base portion in a circumferential direction.

(5) Further, in accordance with a fifth aspect of the present invention, in order to achieve the object mentioned above, there is provided a combination weighing apparatus as recited in the first aspect, further comprising:

a plurality of memory hoppers receiving the subject to be weighed which is weighed by the weighing hoppers;

a first side surface cover integrally formed so as to surround at least the weighing device base portion in a circumferential direction; and a second side surface cover integrally formed so as to surround at least a driving portion opening and closing a lid of a discharge port in the memory hopper in a circumferential direction, wherein the first and second side surface covers are formed so as to be respectively separated into at least two in a vertical direction.

(6) Further, in accordance with a sixth aspect of the present invention, in order to achieve the object mentioned above, there is provided a combination weighing apparatus comprising:

a plurality of feeders supplying a subject to be weighed;

a feeder base to which the plurality of feeders are fixed;

a plurality of weighing hoppers receiving the subject to be weighed which is supplied by the plurality of feeders;

a plurality of weighing devices for weighing the subject to be weighed which is received in the weighing hoppers;

a weighing device base to which the plurality of weighing devices are fixed; and a stand constituted by a plurality of metal supporting columns provided at a predetermined interval in a circumferential direction, having leg portions standing up from placing surfaces and supporting portions including horizontal portions connected to the leg portions and the horizontal portions of the supporting portions being connected to each other at a center portion, wherein the feeder base is directly fixed to an upper surface of a center connecting portion of the stand, and the weighing device base is directly fixed to a lower surface of the center connection portion of the stand.

(7) Further, in accordance with a seventh aspect of the present invention, in order to achieve the object mentioned above, there is provided a combination weighing apparatus as recited in the sixth aspect, wherein the weighing device base is a hollow tube body, the plurality of weighing devices are fixed to an outer peripheral portion of the hollow tube body, and a wiring path for the plurality of weighing devices is provided in an inner portion of the hollow tube body.

(8) Further, in accordance with an eighth aspect of the present invention, in order to achieve the object mentioned above, there is provided a combination weighing apparatus as recited in the sixth aspect, wherein a vibration sensor commonly used for compensating for the vibrations of the plurality of weighing devices is mounted to the weighing device base.

(9) Further, in accordance with a ninth aspect of the present invention, in order to achieve the object mentioned above, there is provided a combination weighing apparatus as recited in the sixth aspect, further comprising a side surface cover integrally formed so as to surround the weighing device base portion in a circumferential direction.

(10) Further, in accordance with a tenth aspect of the present invention, in order to achieve the object mentioned above, there is provided a combination weighing apparatus as recited in the sixth aspect, further comprising:

a plurality of memory hoppers receiving the subject to be weighed which is weighed by the weighing hoppers;

a first side surface cover integrally formed so as to surround at least the weighing device base portion in a circumferential direction; and a second side surface cover integrally formed so as to surround at least a driving portion opening and closing an opening and closing lid of a discharge port in the memory hopper in a circumferential direction, wherein the first and second side surface covers are formed so as to be respectively separated into at least two in a vertical direction.

(11) Further, in accordance with an eleventh aspect of the present invention, in order to achieve the object mentioned above, there is provided a combination weighing apparatus comprising:

a plurality of feeders supplying a subject to be weighed;

a feeder base to which the plurality of feeders are fixed;

a plurality of stock hoppers receiving the subject to be weighed which is supplied by the plurality of feeders;

a stock hopper base to which the plurality of stock hoppers are fixed;

a plurality of weighing hoppers receiving the subject to be weighed which is dropped down from the plurality of stock hoppers;

a plurality of weighing devices for weighing the subject to be weighed which is received in the weighing hoppers;

a weighing device base to which the plurality of weighing devices are fixed; and a stand constituted by a plurality of metal supporting columns provided at a predetermined interval in a circumferential direction, having leg portions standing up from placing surfaces and supporting portions including horizontal portions connected to the leg portions and the horizontal portions of the supporting portions being connected to each other at a center portion, wherein the feeder base and the stock hopper base are directly fixed to an upper surface of a center connecting portion of the stand, and the weighing device base is directly fixed to a lower surface of the center connection portion of the stand.

(12) Further, in accordance with a twelfth aspect of the present invention, in order to achieve the object mentioned above, there is provided a combination weighing apparatus as recited in the eleventh aspect, wherein the weighing device base is a hollow tube body, the plurality of weighing devices are fixed to an outer peripheral portion of the hollow tube body, and a wiring path for the plurality of weighing devices is provided in an inner portion of the hollow tube body.

(13) Further, in accordance with a thirteenth aspect of the present invention, in order to achieve the object mentioned above, there is provided a combination weighing apparatus as recited in the eleventh aspect, wherein a vibration sensor commonly used for compensating for the vibrations of the plurality of weighing devices is mounted to the weighing device base.

(14) Further, in accordance with a fourteenth aspect of the present invention, in order to achieve the object mentioned above, there is provided a combination weighing apparatus as recited in the eleventh aspect, further comprising a side surface cover integrally formed so as to surround the feeder base, the stock hopper base and the weighing device base portion in a circumferential direction.

(15) Further, in accordance with a fifteenth aspect of the present invention, in order to achieve the object mentioned above, there is provided a combination weighing apparatus as recited in the eleventh aspect, further comprising:

a plurality of memory hoppers receiving the subject to be weighed which is weighed by the weighing hoppers;

a first side surface cover integrally formed so as to surround at least the feeder base, the stock hopper base and the weighing device base portion in a circumferential direction; and a second side surface cover integrally formed so as to surround at least a driving portion opening and closing an opening and closing lid of a discharge port in the memory hopper in a circumferential direction, wherein the first and second side surface covers are formed so as to be respectively separated into at least two in a vertical direction.

In accordance with the combination weighing apparatus of the present invention as mentioned above, since the weighing device base to which the plurality of weighing devices are fixed is directly fixed to the stand, the influence of the vibrating devices in the feeders is hard to be transmitted to the weighing device base, so that a weighing accuracy with respect to the subject to be weighed executed by each of the weighing devices is improved.

Further, in accordance with the combination weighing apparatus of the present invention as mentioned above, since the feeder base to which the plurality of feeders are fixed, and the weighing device base to which the plurality of weighing devices are fixed are directly fixed to the upper and lower surfaces of the stand so as to hold the stand therebetween, the influence of the vibrating devices in the feeders does not effect the weighing device base, so that a weighing accuracy with respect to the subject to be weighed executed by each of the weighing devices is improved.

(16) In accordance with a sixteenth aspect of the present invention, in order to achieve the object mentioned above, there is provided a combination weighing apparatus comprising:

a plurality of feeders supplying a subject to be weighed;

a plurality of weighing hoppers receiving the subject to be weighed which is supplied by the plurality of feeders;

a plurality of weighing devices for weighing the subject to be weighed which is received in the weighing hoppers;

a weighing device base to which the plurality of weighing devices are fixed;

a stand constituted by a plurality of metal supporting columns provided at a predetermined interval in a circumferential direction, having leg portions standing up from placing surfaces and supporting portions including horizontal portions connected to the leg portions and the horizontal portions of the supporting portions being connected to each other at a center portion;

a plurality of memory hoppers receiving a subject to be weighed which is weighed by the weighing hoppers;

a first side surface cover integrally formed so as to surround at least the weighing device base portion in a circumferential direction; and a second side surface cover integrally formed so as to surround at least a driving portion for opening and closing opening and closing lids in discharge ports of the memory hoppers in a circumferential direction, wherein the weighing device base is directly fixed to a lower surface of the center connection portion of the stand, and wherein the first and second side surface covers are respectively formed so as to be separated into at least two portions in a vertical direction, the first side surface cover is fixed to the plurality of supporting column portions of the stand, and the second side surface cover is structured such as to be vertically moved by an elevating apparatus so as to open and close between the first side surface cover disposed in an upper side and the second side surface cover disposed in a lower side.

In accordance with the combination weighing apparatus, since the casing (the first and second side surface covers) is vertically separated and vertically moved so as to open and close therebetween, the drive sources and the weighing devices within the casing can be taken in and out through the opening surface vertically separated in the casing, so that it is not necessary to provide the large-sized hole for taking in and out the drive sources and the weighing devices in the casing itself, and a significantly small hole through which the lever for opening and closing the opening and closing lid passes is only required.

Accordingly, in the combination weighing apparatus, since it is not necessary to attach the mounting plate for closing the large hole and the structure becomes simple, the subject to be weighed which is attached and accumulated is reduced, a sanitary property is significantly improved, and a waterproof property at a time of cleaning is significantly improved.

Further, it is not required to execute a troublesome operation such as an inspection of the drive sources, the weighing devices and the like within the casing, an attachment and detachment of the mounting plate and the like at a time of maintenance, and the like, and it is required to only vertically move the separated casing, so that the inspection and the maintenance can be significantly easily executed.

(17) Further, in accordance with a seventeenth aspect of the present invention, in order to achieve the object mentioned above, there is provided a combination weighing apparatus as recited in the sixteenth aspect, wherein the vertically moving apparatus suspends the second side surface cover disposed in the lower side from a side of the first side surface cover disposed in the upper side by a wire and vertically moves by a winch provided in a side of the first side surface cover disposed in the upper side so as to open and close between the first side surface cover disposed in the upper side and the second side surface cover disposed in the lower side.

In accordance with the combination weighing apparatus mentioned above, it is possible to wind up and down the lower side separated casing suspended by the wire by the winch so as to significantly easily open and close the separated casing.

(18) Further, in accordance with an eighteenth aspect of the present invention, in order to achieve the object mentioned above, there is provided a combination weighing apparatus as recited in the seventeenth aspect, wherein lower end portions of the plurality of wires suspending and supporting the lower side second side surface cover are respectively mounted to the lower side second side cover via urging means.

In accordance with the combination weighing apparatus, an individual difference of a tensional force applied by a plurality of wires suspending the lower side second side surface cover can be absorbed by the urging means provided in the lower ends of the respective wires.

Further, it is possible to absorb an impact at a time of stopping the winding up and down operation executed by the winch.

(19) Further, in accordance with a nineteenth aspect of the present invention, in order to achieve the object mentioned above, there is provided a combination weighing apparatus as recited in the seventeenth aspect, wherein a hole for operation is provided in the upper side first side surface cover, and the lower side casing can be vertically moved by inserting an operating device from the hole so as to operate the winch.

In accordance with the combination weighing apparatus, it is possible to vertically open and close the casing from the external portion in an easy manner.

(20) Further, in accordance with a twentieth aspect of the present invention, in order to achieve the object mentioned above, there is provided a combination weighing apparatus as recited in the nineteenth aspect, wherein the winch is provided with a rotary shaft rotating in accordance with an operation from the external portion, provided with a moving body moving in an axial direction of the rotary shaft in correspondence to an amount of rotation of the rotary shaft, and provided with a restricting body restricting a moving range of the moving body so as to restrict a wind-up amount or a wind-down amount executed by the winch.

In accordance with the combination weighing apparatus, it is possible to automatically determine a range for winding up and down the lower side separated casing executed by the winch.

(21) Further, in accordance with a twenty first aspect of the present invention, in order to achieve the object mentioned above, there is provided a combination weighing apparatus having a plurality of hoppers provided along an outer periphery of a casing, wherein the casing is vertically separated into at least two portions, a shaft is protruded downward from the separated casing disposed in an upper side, and the separated casing disposed in a lower side is mounted in a vertically movable manner along the shaft so as to open and close between the upper side separated casing and the lower side separated casing.

In accordance with the combination weighing apparatus, it is possible to vertically move the lower side separated casing along the shaft so as to easily open and close the casing in a vertical direction, so that it is easy to inspect and maintain the drive sources and the weighing devices within the casing.

(22) Further, in accordance with a twenty second aspect of the present invention, in order to achieve the object mentioned above, there is provided a combination weighing apparatus having a plurality of hoppers provided along an outer periphery of a casing, wherein the casing is vertically separated into at least two portions, a circular column provided with a screw surface is protruded downward from the separated casing disposed in an upper side, and the separated casing disposed in a lower side is engaged with the circular column so as to rotate the lower side separated casing, thereby vertically moving so as to open and close between the upper side separated casing and the lower side separated casing.

In accordance with the combination weighing apparatus, it is possible to vertically move the lower side separated casing along the circular column by rotating the lower side separated casing so as to easily open and close the casing in a vertical direction, so that it is easy to inspect and maintain the drive sources and the weighing devices within the casing;

BRIEF DESCRIPTION OF DRAWINGS

FIG. 1A is a front elevational view showing a combination weighing apparatus in accordance with a first embodiment of the present invention;

FIG. 1B is a front elevational view showing a placing state of a combination weighing apparatus in accordance with the first embodiment of the present invention;

FIG. 1C is a partial view showing a placing state of a combination weighing apparatus in accordance with the first embodiment of the present invention;

BEST MODE OF CARRYING OUT OF THE INVENTION

A description will be given below of embodiments in accordance with the present invention with reference to the accompanying drawings.

First Embodiment

FIGS. 1A to 17 show a whole structure and structures of respective portions in a combination weighing apparatus in accordance with a first embodiment of the present invention.

In this case, FIG. 1B shows a placing state of the combination weighing apparatus in accordance with the first embodiment of the present invention.

Further, FIG. 1C shows a partial view of the placing state of the combination weighing apparatus in accordance with the first embodiment of the present invention.

At first, a casing 20 is supported by a stand A comprising four supporting columns 30, 31, 32 and 33.

A number of hoppers 130, 130, . . . are provided on an outer periphery of the casing 20 so as to be arranged in a cylindrical shape.

The casing 20 is provided with a cylindrical casing main body 21 in which an upper end and a lower end are opened and a lower half portion is formed so as to have a smaller diameter than that of an upper half portion.

The casing main body 21 is supported by four supporting columns 30, 31, 32 and 33 constituting the stand A.

Figure 4:
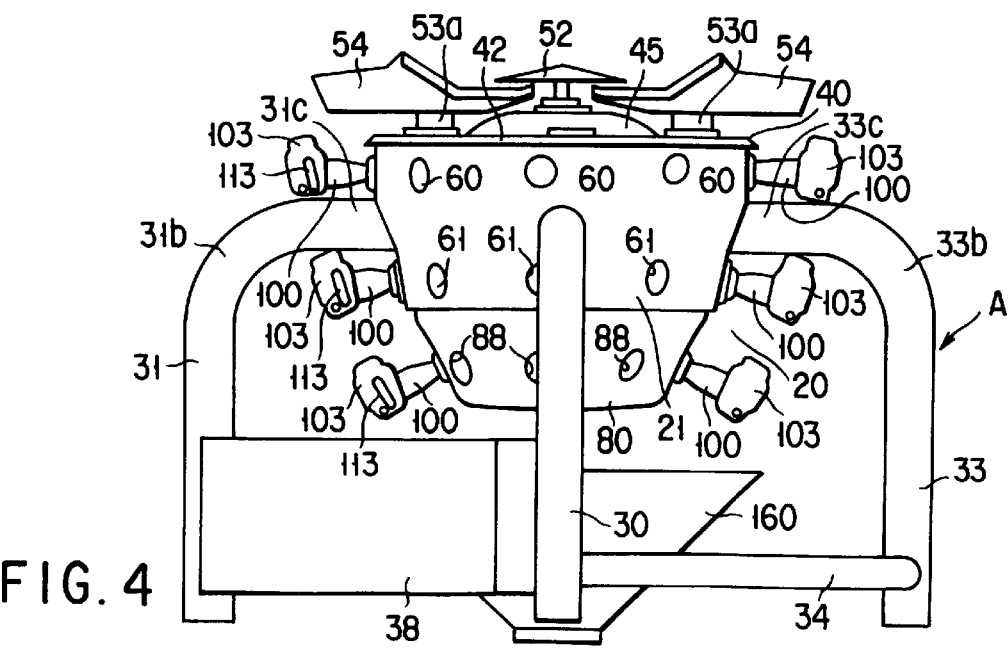
FIG. 4 is a front elevational view showing a state that hoppers of the combination weighing apparatus in accordance with the first embodiment of the present invention are taken out.
Figure 3:
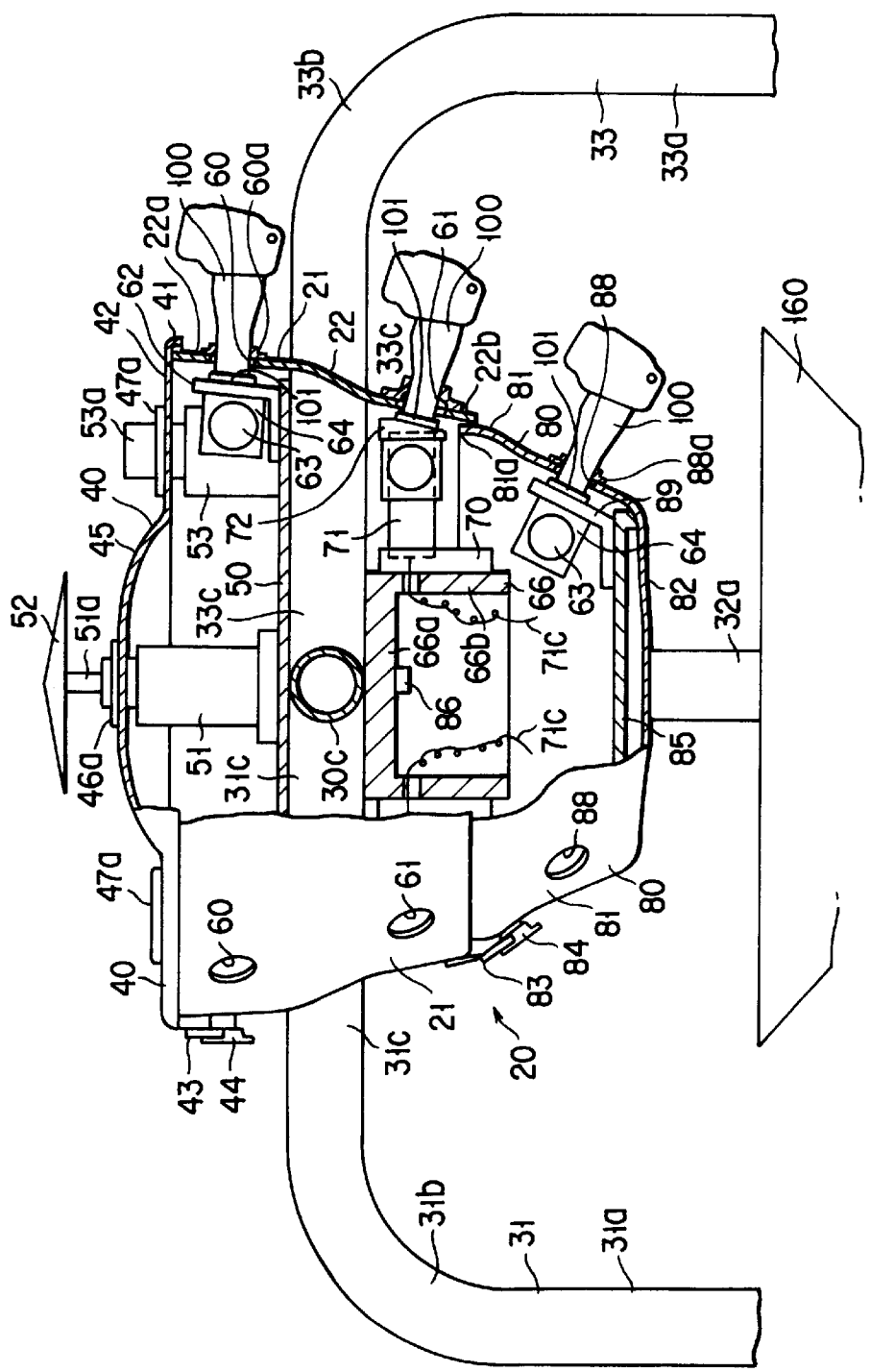
FIG. 3 is a cross sectional view showing in a state of breaking a part of the combination weighing apparatus in accordance with the first embodiment of the present invention.
Figure 5:
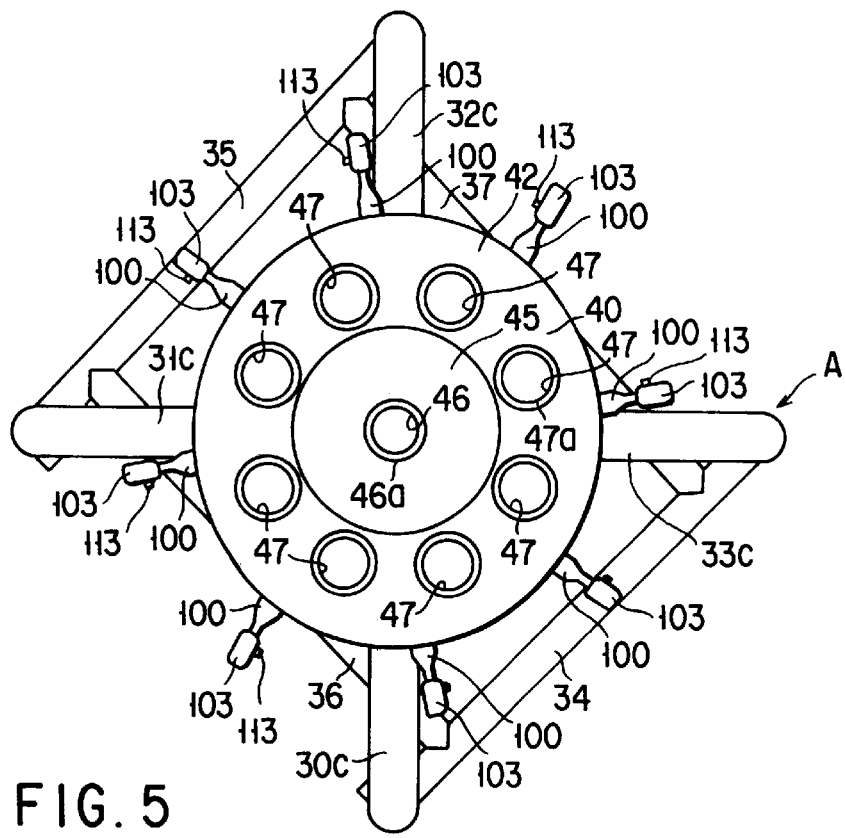
FIG. 5 is a plan view of a state that the hoppers of the combination weighing apparatus in accordance with the first embodiment of the present invention are taken out.

That is, as shown in FIGS. 3 to 5, the stand A is constituted by four supporting columns 30, 31, 32 and 33 having leg portions 30a, 31a, 32a and 33a which are respectively provided at an interval of 90 degrees in a circumferential direction, made of, for example, a metal, formed in a cylindrical shape and vertically stood up from a contact surface, fan-shaped curved portions 30b, 31b, 32b and 33b which are connected to the leg portion, and supporting portions 30c, 31c, 32c and 33c which include horizontal portions connected to the curved portions, and in which the horizontal portions of the supporting portions are connected to each other by a center portion.

Circular holes (not shown) through which the supporting portions 30c, 31c, 32c and 33c including the horizontal portions in the respective supporting columns 30, 31, 32 and 33 are inserted at an interval of 90 degrees in the circumferential direction are provided in a substantially center portion in a vertical direction, in a peripheral wall portion 22 of the casing main body 21.

Further, front ends of the respective supporting portions 30c, 31c, 32c and 33c including the horizontal portions are combined cut portion at 45 degrees in both sides to each other.

Accordingly, four supporting portions 30c, 31c, 32c and 33c including the horizontal portions are inserted inward from four holes mentioned above, respectively, and front end portions of four supporting portions 30c, 31c, 32c and 33c including the horizontal portions are bonded in a center of an inner portion of the casing main body 21 by a suitable means such as a welding or the like so as to form a cross form.

As shown in FIG. 5, the vertically standing leg portions 30a and 33a of adjacent two supporting columns 30 and 33 are connected by a cylindrical horizontal frame 34.

Further, in the same manner, the vertically standing leg portions 31a and 32a of adjacent two supporting columns 31 and 32 are connected by a cylindrical horizontal frame 35.

Further, the horizontal frames 34 and 35 are connected by two horizontal frames 36 and 37.

Figure 2:
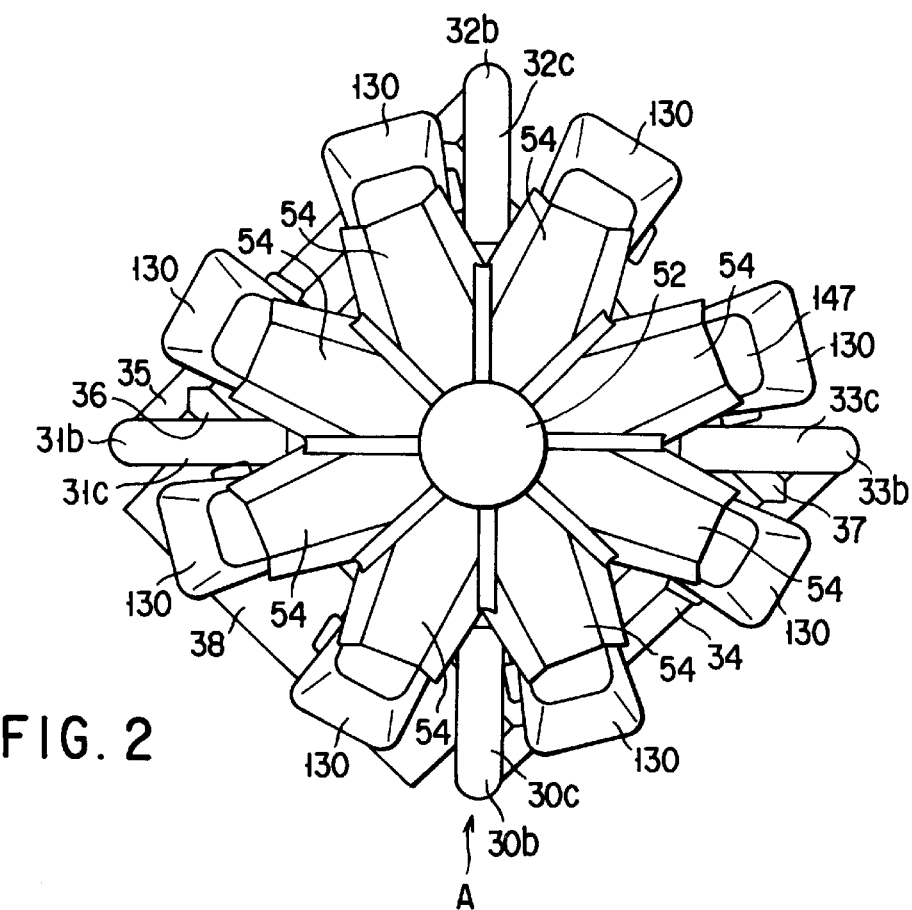
FIG. 2 is a plan view of the combination weighing apparatus in accordance with the first embodiment of the present invention.

A control box 38 for controlling operations of respective portions in the combination weighing apparatus is mounted to the horizontal frame 36 (refer to FIGS. 1A and 2).

The casing 20 is constituted by the casing main body 21 which is integrally formed and comprises a cylindrical first side surface cover 22 having a small diameter lower side, a disc-like lid body 40 and a bottom plate body 80 which is integrally formed and comprises a second side surface cover 81 having a small diameter lower side and a bottom plate 82.

As shown in FIG. 3, the lid body 40 is formed in a disc shape, an outer peripheral edge portion 41 is protruded downward from an outer periphery of a disc portion 42 in the lid body 40 formed in a disc shape including the disc portion 42 in such a manner as to surround an upper end opening edge portion 22a of the first side surface cover 22 in the casing main body 21.

Engagement hooks 43 are provided in the outer peripheral edge portion 41 of the lid body 40 at a plurality of portions in a circumferential direction.

Further, engagement operating devices 44 for hooking the engagement hooks 43 are provided at upper ends of the first side surface cover 22 of the casing main body 21.

By operating the engagement operating devices 44 so as to take out the engagement hooks 43, it is possible to lift up the lid body 40 upward from the casing main body 21 so as to take out the same.

A spherical surface portion 45 swelling upward in a spherical surface shape is provided in a center of the disc portion 42 of the lid body 40.

As shown in FIG. 5, a circular hole 46 is provided in a center of the spherical surface portion 45.

Further, a number of (eight shown in the embodiment shown in FIG. 5) circular holes 47, 47, . . . are provided in a circumferential direction, in the disc portion 42 on an outer periphery of the spherical surface portion 45, at uniform intervals.

Hole edge portions 46a and 47a are protruded upward from the respective holes 46 and 47.

As shown in FIG. 3, a disc-like feeder base plate 50 is directly fixed to an upper surface of the supporting portions 30c, 31c, 32c and 33c including the horizontal portions of four supporting columns 30, 31, 32 and 33 constituting the stand A which has a significantly high rigidity and is firmly constructed by being bonded within the casing main body 21 in a cross shape by a suitable means such as welding or the like.

In this case, the feeder base 50 is commonly used as a stock hopper base for mounting stock hoppers mentioned below.

In this case, a rotation driving motor 51 is mounted to a central upper surface of the feeder base 50, in correspondence to the center hole 46 of the lid body 40.

A rotary shaft 51a of the rotation driving motor 51 protrudes upward from the center hole 46 of the lid body 40.

A circular umbrella-shaped dispersion table 52 is detachably mounted to an upper end of the rotary shaft 51a.

This dispersion table 52 integrally rotates with the rotary shaft 51a.

Further, a plurality of vibrating devices 53 are respectively mounted in a state of being arranged side by side in a circumferential direction on the upper surface of the feeder base 50, in correspondence to the respective holes 47 arranged in a cylindrical direction of the disc portion 42 of the lid body 40 at a uniform interval.

Vibration shafts 53a of the respective vibrating devices 53 protrude upward from the respective holes 47 in the disc portion 42 of the lid body 40.

As shown in FIG. 2, radial feeders 54, 54, . . . receiving the subject to be weighed which is dropped down and supplied from the center dispersion table 52 are detachably mounted to the upper ends of the respective vibration shafts 53a in a radial manner so as to surround the dispersion table 52.

Accordingly, the subject to be weighed which is dropped and supplied to the radial feeders 54, 54, . . . from the dispersion table 52 is sequentially moved forward to an outer portion in a radial direction due to vibration of the radial feeders 54, 54, . . . so as to be dropped down from the front ends thereof.

As mentioned above, since the feeder base 50 to which the vibrating device 53 for vibrating the feeder 54 is fixed is directly fixed to the stand A having a significantly high rigidity and firm construction, the influence of the vibration applied to a weighing device base 66 mentioned below hardly exists, and weighing accuracy is improved.

A rubber packing (not shown) is attached to each of a hole edge portion 46a of the hole 46 and a hole edge portion 47a of the hole 47 so as to prevent the subject to be weighed and the water at a time of cleaning from entering the lid body 40.

Circular arm insertion holes 60 and 61 arranged in correspondence to the respective feeders 54, 54, . . . at a uniform interval in the circumferential direction in an upper side and a lower side of the leg portions including the horizontal portions 30c, 31c, 32c and 33c of the supporting columns 30, 31, 32 and 33 are provided in the side cover 22 of the casing main body 21 so as to form two stages.

Arm supporting plates 62 facing the respective arm insertion holes 60 are stood from the upper surface of the base plate 50, in correspondence to the respective arm insertion holes 60 disposed in the upper side of the side surface cover 22 of the casing main body 21.

Figure 6:
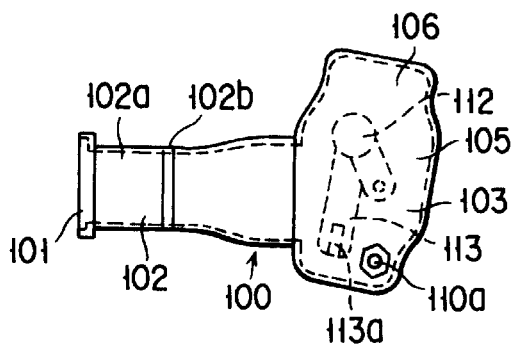
FIG. 6 is a front elevational view showing hopper supporting arms of the combination weighing apparatus in accordance with the first embodiment of the present invention.
Figure 7:
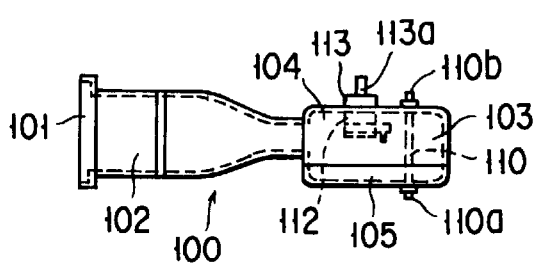
FIG. 7 is a plan view of the hopper supporting arms of the combination weighing apparatus in accordance with the first embodiment of the present invention.
Figure 8:
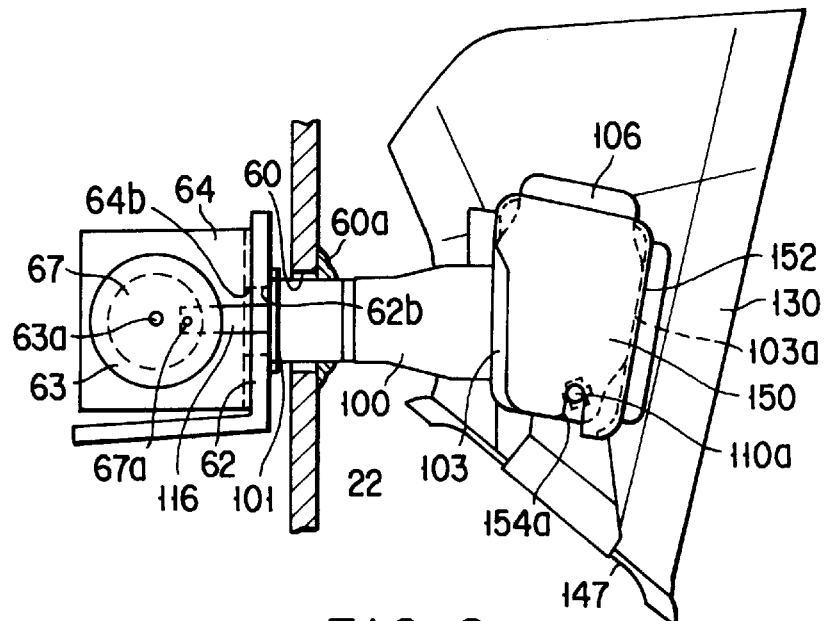
FIG. 8 is a front elevational view of a state that hoppers (stock hoppers) are attached to the hopper supporting arms of the combination weighing apparatus in accordance with the first embodiment of the present invention.
Figure 9:
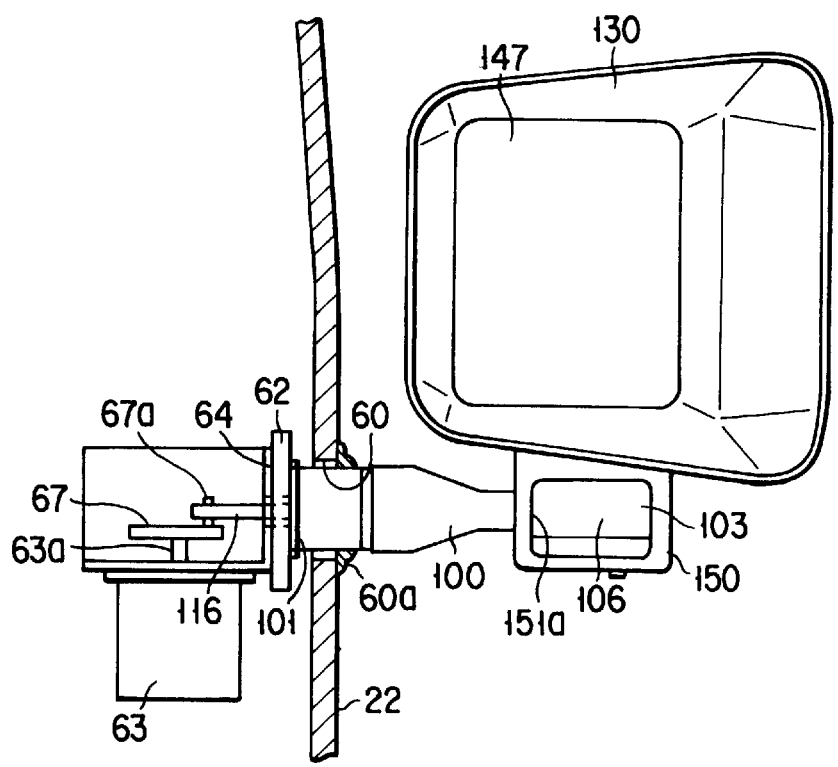
FIG. 9 is a plan view of a state that the hoppers (the stock hoppers) are attached to the hopper supporting arms of the combination weighing apparatus in accordance with the first embodiment of the present invention.

Hollow hopper supporting arms 100 shown in FIGS. 6 and 7 for supporting the hoppers (the stock hoppers) 130 and the opening and closing lid are fixed to outer surfaces of the arm supporting plates 62 due to a screwing operation of flange portions 101 thereof, in such a manner as to radially protrude outward from the respective arm insertion holes 60 in the upper side of the side surface cover 22 of the casing main body 21 as shown in FIGS. 8 and 9.

A base portion of an arm portions 102 in the hopper supporting arm 100 is formed in a cylindrical shape, and a little gap with respect to the arm inserting hole 60 of the side surface cover 22 in the casing main body 21 is sealed by a rubber packing 60a so as to prevent the subject to be weighed and the water at a time of cleaning from entering the inner portion.

An opening and closing operation driving motor (a drive source) 63 for opening and closing the lid 147 in the hopper 130 is mounted to an inner surface of each of the arm supporting plates 62 by a motor mounting frame 64.

As shown in FIG. 3, an upper bottom portion 66a at an upper end of a hollow polygonal tube shaped weighing device base 66 formed in a polygonal shape corresponding to a number of the feeders 54 and being thick is directly fixed to the lower surfaces of the leg portions 30c, 31c, 32c and 33c including the horizontal portions of four supporting columns 30, 31, 32 and 33 constituting the stand A bonded within the casing main body 21 in a cross shape by a suitable means such as welding or the like.

Figure 10:
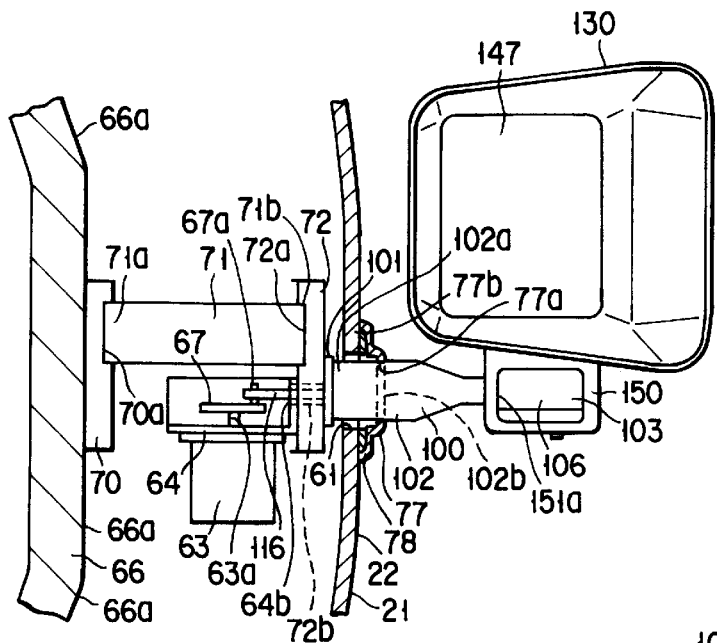
FIG. 10 is a front elevational view of a state that hoppers (weighing hoppers) are attached to the hopper supporting arms of the combination weighing apparatus in accordance with the first embodiment of the present invention.

As shown in FIGS. 3 and 10, respective polygonal flat surfaces 66b, 66b, . . . of the weighing device base 66 have directions corresponding to the respective arm insertion holes 61, 61, . . . in the lower side.

Further, a fixing table 70 is fixed to an outer side in each of the flat surfaces 66b by a suitable means such as screwing or the like.

A fitting groove 70a in a vertical direction is provided in an outer surface side of the fixing table 70.

A fixed end 71a of a load cell (a weighing device) 71 is fitted and fixed to the fitting groove 70a by a suitable means such as screwing or the like, whereby the load cell (the weighing device) 71 is supported by the base table 70 in a cantilever manner.

As mentioned above, since the weighing device base 66 fixing the weighing device is directly fixed to the stand A having a significantly high rigidity and being firmly structured, the weighing device base 66 is hard to be affected by the vibration of the vibrating device 53 in the feeder 54, so that the weighing accuracy is improved.

A single vibration sensor 86 for detecting the vibration of the floor surface on which the stand A is placed so as to correct the weighing error due to the vibration is mounted to the weighing device base 66.

Further, the weighing device base 66 is a hollow tube body, a plurality of load cells (the weighing devices) 71, 71, . . . are fixed to an outer peripheral portion of the hollow tube body, and wiring paths 71c, 71c, . . . of a plurality of weighing devices 71, 71, . . . are provided within the hollow tube body.

Further, since all of the load cells (the weighing devices) 71, 71, . . . are fixed to the weighing device base 66 corresponding to one integral rigid body, it is sufficient to mount the single vibrating sensor 86 to the weighing device base 66 in the manner mentioned above.

An arm supporting plate 72 is fixed to a free end 71b of each of the load cells 71.

That is, the arm supporting plate 72 is provided with a fitting groove 72a in a vertical direction.

The free end 71b of the load cell 71 is fitted to the fitting groove 72a, and fixed thereto by a suitable means such as screwing or the like.

The hollow hopper supporting arm 100 for supporting the hopper (the weighing hopper) 130 and opening and closing the lid 147 is fixed to an outer surface of the arm supporting plate 72 due to a screwing operation of the mounting flange portion 101 in such a manner as to radially protrude outward from each of the arm insertion holes 61 in the lower side of the peripheral wall portion 22 of the casing main body 21.

Further, the opening and closing operation driving motor (the drive source) 63 is mounted to the inner surface of the arm supporting plate 72 by the motor mounting frame 64.

Accordingly, the arm supporting plate 72, the hopper supporting arm 100 and the opening and closing operation driving motor 63 are supported by the free end 71b of the load cell 71.

Accordingly, a diameter of the arm insertion hole 61 is set to be minimum so that an edge portion of the arm insertion hole 61 and a base portion 102a of a cylindrical arm portion 102 positioned at the arm insertion hole 61 of the hopper supporting arm 100 have a minimum gap for keeping a non-contact state, even in the case that the hopper supporting arm 100 vertically moves due to a supply and discharge of the subject to be weighed to and from the hopper (the weighing hopper) 130 supported by the hopper supporting arm 100.

In order to prevent the subject to be weighed and the water at a time of cleaning from entering from the gap between the base portion 102a of the arm portion 102 in the hopper supporting arm 100 and the arm insertion hole 61, a front end portion 77a of a bellows-like rubber packing 77 is fitted to an annular groove 102b of the base portion 102a in the arm portion 102.

A flange portion 77b of the rubber packing 77 is pressed by a cup-shaped cover 78, and is fixed to the edge portion of the arm insertion hole 61 in the peripheral wall portion 22 by a suitable means such as screwing or the like.

Since the rubber packing 77 is formed as a bellows portion capable of freely bending in a middle between the flange portion 77b and the front end portion 77a thereof, the arm portion 102 of the hopper supporting arm 100 is not prevented from moving within the arm insertion hole 61 of the base portion 102a due to a charge and discharge of the subject to be weighed to the hopper (the engagement hopper) 130.

The bottom plate body 80 provided in the side of the lower end opening portion of the casing main body 21 is formed in a cup shape constituted, as shown in FIG. 3, by a cylindrical side surface cover 81 in which an upper surface is open and a diameter thereof is gradually reduced in a lower side, and a bottom portion 82 sequentially provided from the side surface cover 81 in a curved surface state.

A diameter of an upper end opening edge portion 81a of the side surface cover 81 is set to be a little smaller than a diameter of the circular lower end opening edge portion 22b of the casing main body 21 so that the upper end opening edge portion 81a of the side surface cover 81 is received within the lower end opening edge portion 22b of the side surface cover 22 in the casing main body 21 at a little gap.

Further, engagement hooks 83 are provided at a plurality of portions in the circumferential direction in the lower end opening edge portion 22b of the side surface cover 22 in the casing main body 21.

Further, an engagement operating device 84 for engaging the engagement hook 83 is provided at the upper end of the side surface cover 81 of the bottom plate body 80.

As shown in FIG. 3, by engaging the engagement hook 83 by the engagement operating device 84, the bottom plate body 80 is mounted to the casing main body 21 in a state that the upper end opening edge portion 81a of the bottom plate body 80 is received inside the lower end opening edge portion 22b of the casing main body 21 at a little gap.

It is possible to take out the bottom plate body 80 downward from the casing main body 21 by operating the engagement operating device 84 so as to take out the engagement hook 83.

In this case, a base table 85 is fixed to an inner surface of the bottom portion 82 of the bottom plate body 80.

Further, circular arm insertion holes 88, 88, . . . are provided in the second side surface cover 81 of the bottom plate body 80 side by side in a circumferential direction in correspondence to the respective arm insertion holes 61, 61, . . . of the casing main body 21.

Further, an arm supporting plate 89 is stood from an upper surface of the base table 85 fixed to the bottom plate body 80 in such a manner as to face to each of the arm insertion holes 88 in correspondence to each of the arm insertion holes 88 of the bottom plate body 80.

The hollow hopper supporting arm 100 for supporting the hopper (the memory hopper) 130 and opening and closing the opening and closing lid 147 is fixed to an outer surface of each of the arm supporting plates 89 due to a screwing operation of the mounting flange portion 101 in such a manner as to radially protrude outward from each of the arm insertion holes 88, 88, . . . of the side surface cover 81 in the bottom plate body 80.

The base portion 102a of the arm portion 102 in the hopper supporting arm 100 is formed in a cylindrical shape, and the little gap between the peripheral wall portion 81 of the bottom plate body 80 and the arm insertion hole 88 is sealed by the rubber packing 88a, thereby preventing the subject to be weighed and the water at a time of cleaning from entering to the inner portion.

The opening and closing operation driving motor (the drive source) 63 for opening and closing the opening and closing lid 147 of the hopper 130 is mounted to the inner surface of each of the arm supporting plates 89 by the motor mounting frame 64.

As mentioned above, an outer periphery of the casing 20 is not formed in an octagonal shape, for example, even in the case that eight hoppers are mounted in a circumferential direction, and is formed in a circular cup shape surrounded by a smooth second side surface cover constituted by a circular curved surface as a whole, as shown in FIGS. 4 and 5, by the circular lid body 40, the cylindrical casing main body (the first side surface cover) 21 and the cup-shaped bottom plate body 80.

In this case, there is shown the structure in which the casing 20 is separated into the casing main body (the first side surface cover) 21 and the bottom plate body (the second side surface cover) 80, however, the structure may be made such that these elements are integrally constructed without being separated.

The hopper supporting arm 100 provided so as to form three stages is constituted, as shown in FIGS. 6 and 7, by a hollow pipe-shaped arm portion 102, a mounting flange portion 101 for fixing to a supporting plate integrally protruded from one end of the arm portion 102, and a hollow rectangular parallelepiped head portion (a hopper attaching portion) 103 sequentially provided in another end side of the arm portion 102 so that all of the surfaces have roundness.

Figure 11:
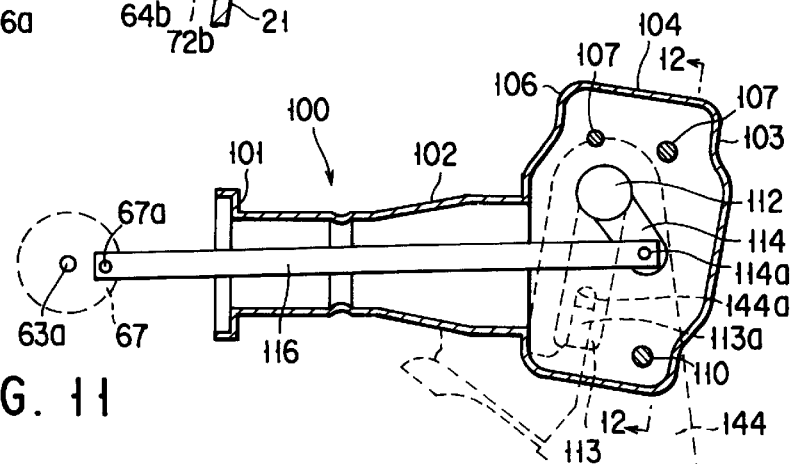
FIG. 11 is a cross sectional view showing the hopper supporting arms and opening and closing operation driving mechanisms in the combination weighing apparatus in accordance with the first embodiment of the present invention.
Figure 12:
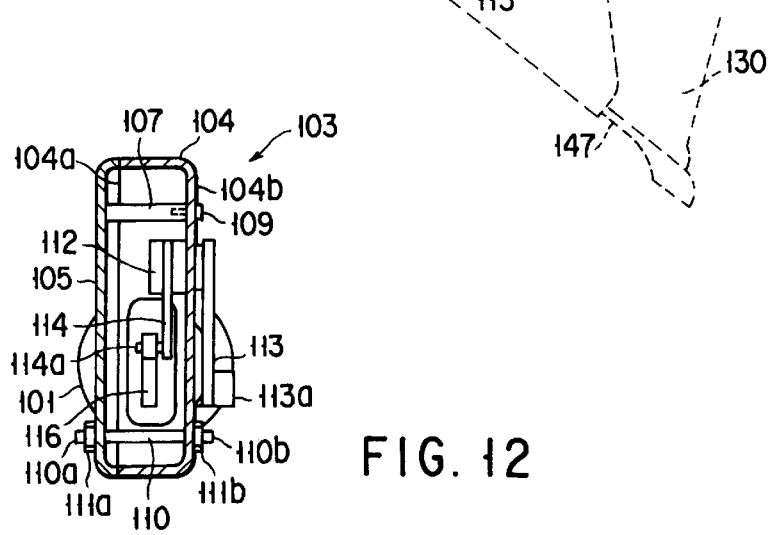
FIG. 12 is a cross sectional view along a line 12—12 in FIG. 11.

The head portion 103 is integrally protruded from the hollow arm portion 102, as shown in FIGS. 11 and 12, and is constituted by a head portion main body 104 in which a side portion is open, and a side lid 105 mounted to a side opening portion 104a of the head portion main body 104 in a butt manner.

An upper end of the head portion 103 forms a fitting head portion 106 in which a width in a longitudinal direction (a lateral direction in FIG. 11) is narrowed so as to be suitably fitted to a fitting hole 151a (refer to FIG. 16) of an upper surface plate 151 in an engagement hood 150 provided on a side surface of each of the hoppers 130.

A plurality of studs 107 having screw holes at front ends thereof are vertically stood from an inner portion main body 104 so as to integrally rotate with the rotary shaft 112.

This opening and closing lid driving body 113 is formed in a band plate shape, and an engagement protruding body 113a engaged with an engagement slit 144a (refer to FIG. 17) of a rotary arm 144 in the opening and closing lid 147 of the hopper 130 is protruded from an outer surface in a front end side thereof.

Further, in the inner side of the head portion main body 104, one end of the rotary plate 114 is mounted so as to integrally rotate with the rotary shaft 112.

As shown in FIGS. 8, 9 and 10, a rotary plate 67 is fixed to a drive shaft 63a of the opening and closing operation driving motor 63.

A pin 67a is stood from a position eccentric from a center of rotation of the rotary plate 67.

An operation bar 116 is received within the supporting arm 100 of the hollow hopper 130.

One end of the operation bar 116 is rotatably mounted to a pin 114a stood from the front end of the rotary plate 114 within the head portion 103.

Further, another end of the operation bar 116 protrudes outward from the arm portion 102, and is rotatably mounted to the pin 67a of the rotary plate 67 rotated by the motor 67 through the supporting plate 8 surface of the side lid 105.

Further, the side lid 105 is fixed to the head portion main body 104 by screwing to the screw holes by the screw 109 for the respective studs 107 from the outer sides of a plurality of corresponding holes 108 to the side wall portion 104b of the head portion main body 104.

Further, in the lower portion of the head portion 103, engagement bolts 110 are engaged with engagement grooves 154a and 155a (refer to FIGS. 14 and 17) of the engagement hood 150 provided on the side surface of the hoppers 130, on the same line in the horizontal direction, and both ends 110a and 110b of the engagement bolt 110 are fastened by nuts from the external portion so as to protrude outward at a fixed length from nuts 111a and 111b in a state of protruding outward from a side wall portion 104b in a vertical direction of the head portion main body 104 and both sides of the side lid 105 in a vertical direction.

A rotary shaft 112 provided with a horizontal direction is rotatably mounted to the side wall portion 104b of the head portion main body 104.

One end of the rotary shaft 112 protrudes outward from the side wall portion 104b.

In this outward protruding rotary shaft 112, one end of the opening and closing lid driving body 113 is mounted outside the side wall portion 104b of the head (the supporting plate 72 as shown in FIG. 10 at a center portion, and the hole in the supporting plate 89 at the lowermost state) and the holes 62b (72b) and 64b of the motor mounting frame as shown in FIGS. 8 and 9 at the uppermost stage.

Figure 13:
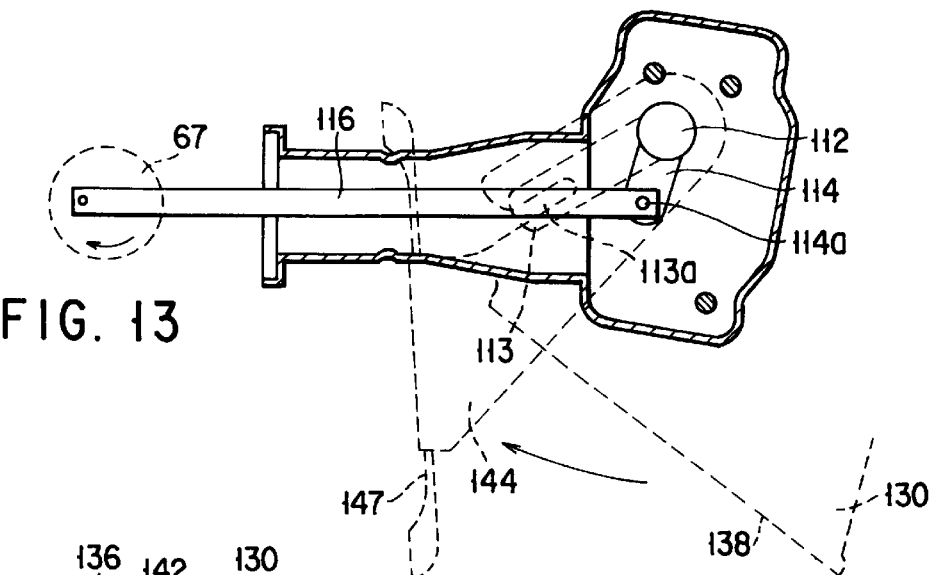
FIG. 13 is a cross sectional view showing the hopper supporting arms and the opening and closing operation driving mechanisms in the combination weighing apparatus in accordance with the first embodiment of the present invention.
Figure 14:
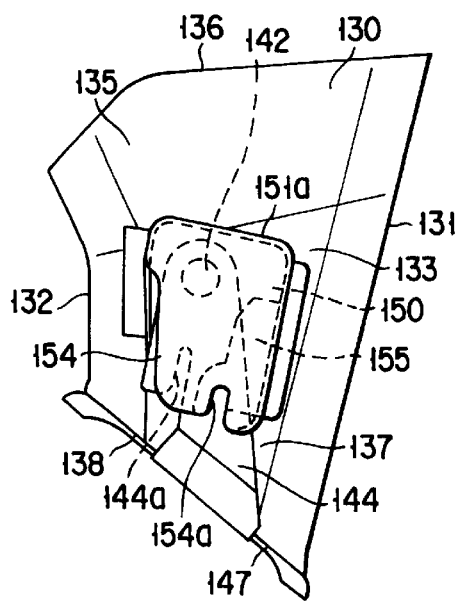
FIG. 14 is a front elevational view showing a hopper employed in the combination weighing apparatus in accordance with the first embodiment of the present invention.

Accordingly, a rotary motion of the rotary plate 67 due to the rotation of the drive shaft 63a of the opening and closing operation driving motor 63 is converted into a swing motion within a predetermined angular range of the rotary plate 114 within the head portion 103 and the opening and closing lid driving body 113 outside the head portion 103, as shown in FIGS. 11 and 13.

Further, the rotary plate 114 and the opening and closing lid driving body 112 rotate in a clockwise direction at a predetermined angle due to one rotation of the rotary plate 67, and thereafter rotate in a counterclockwise direction so as to be returned to an original position.

The hopper 130 is formed in a substantially rectangular conical tube shape obtained by a front surface plate 131, a back surface plate 132 and both side surface plates 133 and 134 with roundness, as shown in FIGS. 14 to 17.

Accordingly, a receiving port 136 is provided at an upper end of an upper half portion 135 in which the front surface plate 131, the back surface plate 132 and both side surface plates 133 and 134 gradually expand upward in a trumpet shape.

Further, both side surface plates 133 and 134 in each of the hoppers are provided with a discharge port 138 at a lower end of a lower half portion 137 in which the front surface plate 131 and the back surface plate 132 gradually come close to each other in a lower side thereof in parallel and vertical directions.

Studs 140 and 141 are stood at the same positions on the outer surfaces of both side surface plates 133 and 134, in the upper portion of the hopper lower half portion 137.

Two flat-shaped mutually parallel rotary arms 144 and 145 are rotatably mounted to the studs 140 and 141 by supporting shafts 142 and 143.

The rotary arms 144 and 145 are formed in a triangular wide shape in the lower portions thereof.

Accordingly, these two rotary arms 144 and 145 are integrally connected by a bottom plate 146.

The opening and closing lid 147 for closing the discharge port 138 in the hopper 130 is fixed to an upper surface of the bottom plate 146 by a suitable means such as welding or the like.

An engagement slit 144a in which a lower side is open so that an engagement protruding body 113a of the opening and closing lid driving body 113 provided in the outer surface side of the head portion 103 is inserted from the lower side so as to be engaged when the hopper 130 is supported by the head portion 103 of the hopper supporting arm 100, is provided in one rotary arm (a coupling) 144.

An engagement hood 150 for being covered on the head portion 103 of the hopper supporting arm 100 from the upper side so as to be engaged is mounted to the side surface plate 133 in the lower half portion 137 in the hopper 130 in such a manner as to cover the upper portion of the rotary arm 144 having the engagement slit 144*a*.

The fitting hood 150 is constituted by an upper surface plate 151, a front surface plate 152, a back surface plate 153 parallel to the front surface plate 152 and a side surface plate 154 on a vertical plane with keeping a roundness.

Further, the fitting hood 150 is formed in a rectangular parallelepiped hollow box shape connected to an open lower surface at a rear surface lower portion.

The upper surface plate 151 has a fitting hole 151*a* with roundness at four corners of a rectangle to which the fitting head portion 106 having a small width in the longitudinal direction of the head portion 103 in the hopper supporting arm 100 is inserted.

Further, an engagement groove 154*a* which the engagement bolt 110*a* protruded outward in a horizontal direction from one side surface of the head portion 103 in the hopper supporting arm 100 is inserted to and engaged with is provided at a lower end of the side surface plate 154.

Figure 15:
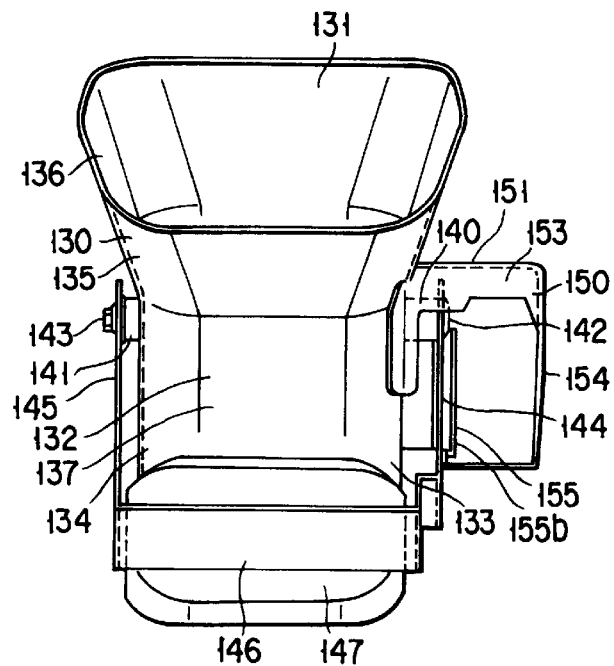
FIG. 15 is a left side elevational view of the hopper of the combination weighing apparatus in accordance with the first embodiment of the present invention.
Figure 16:
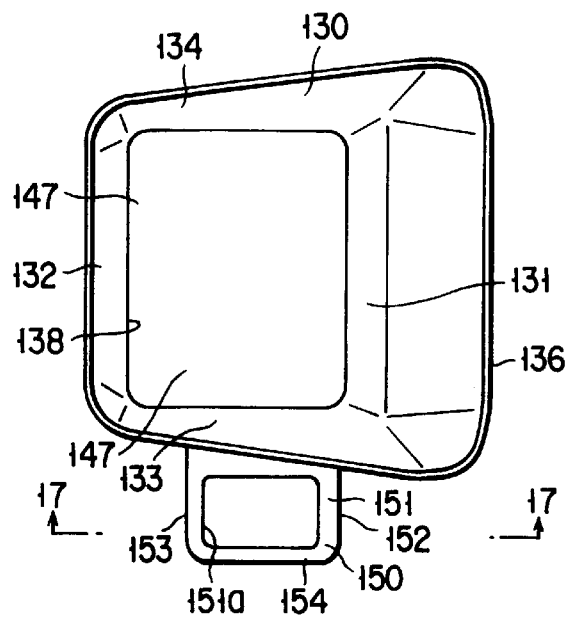
FIG. 16 is a plan view of the hopper of the combination weighing apparatus in accordance with the first embodiment of the present invention.
Figure 17:
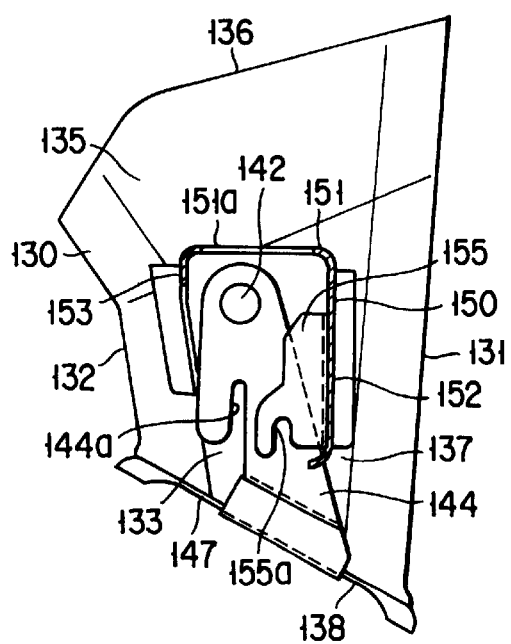
FIG. 17 is a cross sectional view along a line 17—17 in FIG. 16.

On an inner surface of the front surface plate 152 of the engagement hood 150, as shown in FIGS. 15 and 17, a middle plate 155 is fixed to a portion between the perpendicularly bent mounting plate 155*b* and the side surface plate 154 in a parallel manner with an interval capable of receiving the head portion 103 of the hopper supporting arm 100 by a suitable means such as a welding or the like.

At a lower end of the middle plate 155, there is provided an engagement groove 155*a* which another engagement bolt 110*b* outward protruded from a position having the same height one the opposite side surface to the head portion 103 in a horizontal direction is inserted to from the lower side and engaged with.

Further, an interval between the inner surface of the front surface plate 152 in the engagement hood 150 and these engagement grooves 154*a* and 155*a* is set to be substantially equal to an interval between the front surface 103*a* of the head portion 103 and the engagement bolts 110*a* and 110*b*.

Accordingly, as shown in FIGS. 8, 9 and 10, when covering the engagement hood 150 on the head portion 103 of the hopper supporting arm 100 from the upper side, the fitting head portion 106 is inserted and fitted to the fitting hole 151*a* of the upper surface plate 151 in the engagement hood 150 from the lower side.

Further, the engagement bolts 110*a* and 110*b* protruding outward from both sides of the head portion 103 are respectively inserted to and engaged with the engagement groove 154*a* of the side surface plate 154 in the engagement hood 150 and the engagement groove 155*a* of the middle plate 155 from the lower side, and the front surface 103*a* of the head portion 103 is in a state of being brought into contact with the inner surface of the front surface plate 152 of the engagement hood 150.

Accordingly, the head portion 103 of the hopper supporting arm 100 is mounted in an immobile state that the engagement hood 150 covers the head portion 103 from the outer side, and the hopper 130 is mounted in an immobile state.

Further, it is possible to simply take out the fitting hood 150 from the head portion 103 by lifting up the fitting hood 150.

At a time of this mounting, the engagement protruding body 113*a* of the opening and closing lid driving body 113 provided in the external portion from the side wall portion 104*b* of the head portion 103 is inserted to and engaged with the engagement slit 144*a* of the rotary arm (the coupling) 144 in the opening and closing lid 147 from the lower side.

Further, at a time of this mounting, the rotary shaft 112 of the opening and closing lid driving body 113 and the supporting shaft 142 of the rotary arm 144 are arranged so as to coincide on the same axis.

Accordingly, in correspondence that the opening and closing operation driving body 113 rotates within a predetermined angle due to the rotation of the opening and closing operation driving motor 63 in the manner mentioned above, as shown in FIG. 13, the rotary arm (the coupling) 144 and the opening and closing lid 147 rotates within a predetermined angle, whereby the discharge port 138 of the hopper 130 is opened and closed.

As shown in FIG. 1A, a truncated conical funnel-shaped collecting chute 160 for collecting the subject to be weighed discharged from the hopper (the memory hopper) 130 at the lowermost stage is fixed to the horizontal frames 34, 35, 36 and 37 below the casing 20 so as to be coaxial with the casing 20.

Further, as shown in FIG. 1B, a combination weighing apparatus CW structured in the manner mentioned above is placed on a floor surface of a second floor of a mezzanine structured platform PF.

In this case, the combination weighing apparatus CW is placed between the respective bottom portions of the leg portions 30*a*, 31*a*, 32*a* and 33*a* vertically standing up from the contact surface of four supporting columns 30, 31, 32 and 33 constituting the stand A, as shown in FIG. 1C, and the floor surface of the second floor of the platform PF via a height adjusting mechanism HM.

In this case, on the floor surface of the second floor of the platform PF, there is formed a hole for inserting the collecting chute 160 of the combination weighing apparatus CW.

Further, on the floor surface of the first floor of the platform PF, there is placed a packaging machine (not shown) at a position corresponding to the collecting chute 160 of the combination weighing apparatus CW.

Accordingly, the subject to be weighed drops down to the packaging machine (not shown) from a center drop port 161 of the collecting chute 160 of the combination weighing apparatus CW so as to be supplied.

Next, a description will be given of an operation of the combination weighing apparatus structured in the manner mentioned above.

At first, the hopper 130 at the uppermost stage is called a stock hopper, and the subject to be weighed is supplied to the feeder 54 around the dispersion table 52 from the rotating dispersion table 52 disposed in a center portion of the above to which the subject to be weighed is supplied by a conveyor or the like.

Further, the subject to be weighed drops down within the corresponding hopper (the stock hopper) 130 at the uppermost stage from the front end of the feeder 54 vibrated by the vibrating device 53, so as to be received therein.

When the opening and closing lid 147 of the stock hopper 130 at the uppermost stage is opened by driving the opening and closing operation driving motor 63, the subject to be weighed drops within the stock hopper (the weighing hopper) 130 at the lower second stage so as to be received therein.

In this case, when thereafter, the opening and closing lid 147 of the stock hopper is closed by driving the opening and closing operation driving motor 63, the next subject to be weighed is supplied from the radial feeder 54 to the stock hopper.

The subject to be weighed received in the hopper (the weighing hopper) 130 at the second stage is weighed by the weighing device (the load cell 70), and thereafter, the opening and closing lid 147 of the weighing hopper is opened by driving the opening and closing operation driving motor 63, whereby the subject to be weighed drops within the hopper (the memory hopper) 130 at the lowermost stage and received therein.

In this case, when thereafter, the opening and closing lid 147 of the weighing hopper is closed by driving the opening and closing operation driving motor 63, the next subject to be weighed is supplied from the stock hopper to the weighing hopper.

The mass of the subject to be weighed within the hopper (the memory hopper) 130 at the lowermost stage is combined and added by a control portion, and the respective opening and closing lids 147 in a plurality of selected memory hoppers selected to a combination having a total mass which is equal to a set mass or close thereto are opened by driving the respective opening and closing operation driving motors 63.

Accordingly, the subject to be weighed within each of a plurality of combined and selected memory hoppers drop to the collecting chute 160 so as to be collected to one unit and thereafter drops to the packaging machine disposed below the same so as to be packaged.

In this case, thereafter, the opening and closing lid 147 of the memory hopper is closed by driving the opening and closing operation driving motor 63, and the next subject to be weighed is supplied from the weighing hopper.

Hereinafter, the same processes as mentioned above are repeated.

As mentioned above, in accordance with the combination weighing apparatus of the first embodiment of the present invention, in the combination weighing apparatus provided with the stand having the high rigidity and being firmly structured, a plurality of feeders for supplying the subject to be weighed, a plurality of weighing hoppers receiving the supply of the subject to be weighed and a plurality of weighing devices for weighing the subject to be weighed which is received in the weighing hoppers, since the feeder base to which a plurality of feeders are fixed is directly fixed to the stand, the influence of the vibrating device of the feeder is hard to be transmitted to the weighing device base, so that the weighing accuracy is improved.

Further, in accordance with the combination weighing apparatus of the first embodiment of the present invention, since the weighing base to which a plurality of weighing devices are fixed is directly fixed to the stand, the influence of the vibrating device of the feeder is hard to be transmitted to the weighing device base, so that the weighing accuracy is improved.

Further, in accordance with the combination weighing apparatus of the first embodiment of the present invention, since the feeder base to which a plurality of feeders are fixed, and the weighing base to which a plurality of weighing devices are fixed are directly fixed to the stand so as to hold the stand therebetween, the vibrations of the vibrating device of the feeder do not reach the weighing device base, so that the weighing accuracy is improved.

Second Embodiment

In the first embodiment mentioned above, as shown in FIG. 3, there is exemplified a case that the supporting columns 30, 31, 32 and 33 constituting the stand A are formed in a cylindrical shape.

Figure 18:
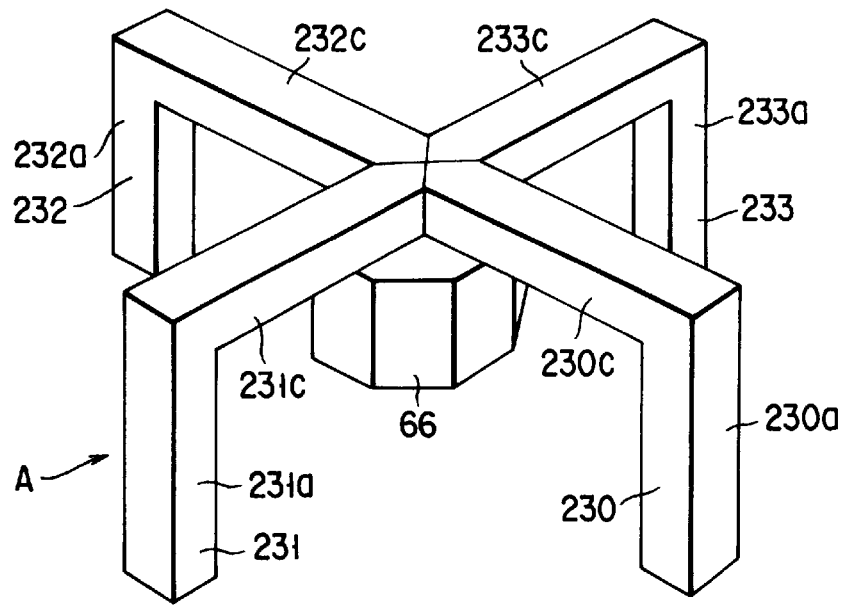
FIG. 18 is a perspective view showing a main portion of a combination weighing apparatus in accordance with a second embodiment of the present invention.

On the contrary, in this second embodiment, as shown in FIG. 18, the stand A is constituted by supporting columns 230, 231, 232 and 233 structured such that leg portions 230a, 231a, 232a and 233a formed in a rectangular column shape and vertically standing up from a contact surface and supporting portions 230c, 231c, 232c and 233c including horizontal portions are vertically arranged.

Third Embodiment

Figure 19:
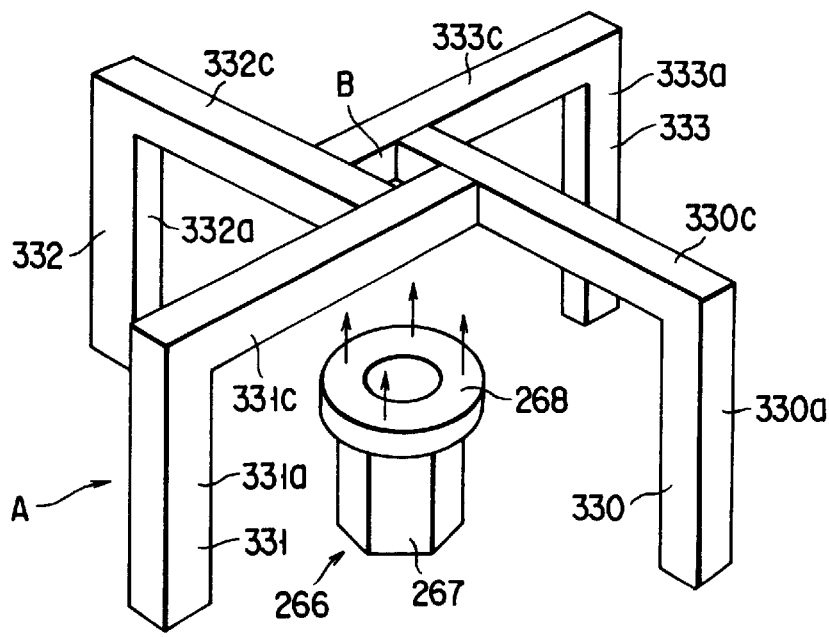
FIG. 19 is a perspective view showing a main portion of a combination weighing apparatus in accordance with a third embodiment of the present invention.
Figure 20:
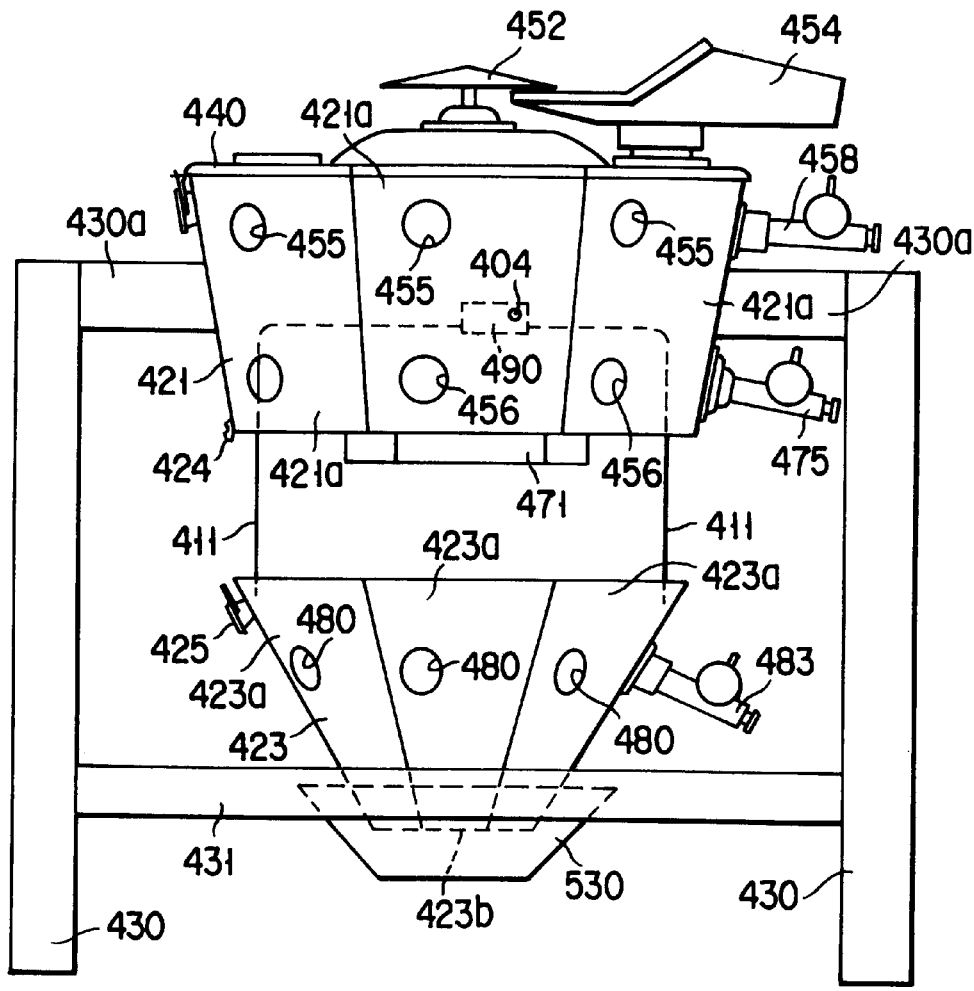
FIG. 20 is a front elevational view showing a combination weighing apparatus in accordance with a fourth embodiment of the present invention.

Further, in the third embodiment, as shown in FIG. 19, four rectangular supporting columns 330, 331, 332 and 333 constituting the stand A are fixed by a suitable means such as welding, bolts or the like so that front end portions of supporting portions 330c, 331c, 332c and 333c including respective horizontal portions alternately form rectangular spaces B.

In this case, a weighing base 266 is constituted by a hollow tube body 267 formed in a polygonal shape corresponding to a number in a circumferential direction of the hoppers and having a large thickness, and a polygonal flange portion 268 disposed at an upper end thereof.

Further, the flange portion 268 may be fixed to the rectangular portion at the front end of the supporting portions 330c, 331c, 332c and 333c including the horizontal portions in the supporting columns 330, 331, 332 and 333.

In accordance with the structure mentioned above, it becomes further easy to fix the weighing device base 266 to the stand A, and it is possible to further reduce the influence of vibrations from the feeder base 50 to the load cell (the weighing device) 71.

Further, in the same manner as the case shown in FIG. 3, the structure may be made such that a hole (not shown) is pieced in the hollow tube body 267 of the weighing device base 266, and the wire from the load cell (the weighing device) 71 is inserted to the inner portion thereof, and a wiring path (not shown) passing toward the rectangular space B within the hollow tube body 267 is provided.

Fourth Embodiment

FIGS. 20 to 23 show the whole structure of the combination weighing apparatus in accordance with the fourth embodiment of the present invention.

As shown in FIGS. 20 to 23, a casing 420 is vertically separated into two portions and constituted by a polygonal tube-like main body (a first separated casing, a first side surface cover) 421 open to upper and lower portions, having a little smaller diameter in a lower side and corresponding to a number of the heads, a polygonal plate-like bottom plate body (a second separated casing, a second side surface cover) 423 fixed by an engagement hook 424 and an engagement operating device 425 in a state that an upper end portion is slightly inserted from a lower surface opening portion of the main body 421 and having an open upper surface.

The main body 421 is constituted by a plurality of flat-shaped side walls 421a, 421a, structured such that a lower width constituting the polygon is narrowed.

Further, the bottom plate body 423 is constituted by flat-shaped side walls 423a, 423a, . . . in which a lower width constituting the polygon is narrowed, and polygonal flat-shaped bottom plates 423b.

Figure 23:
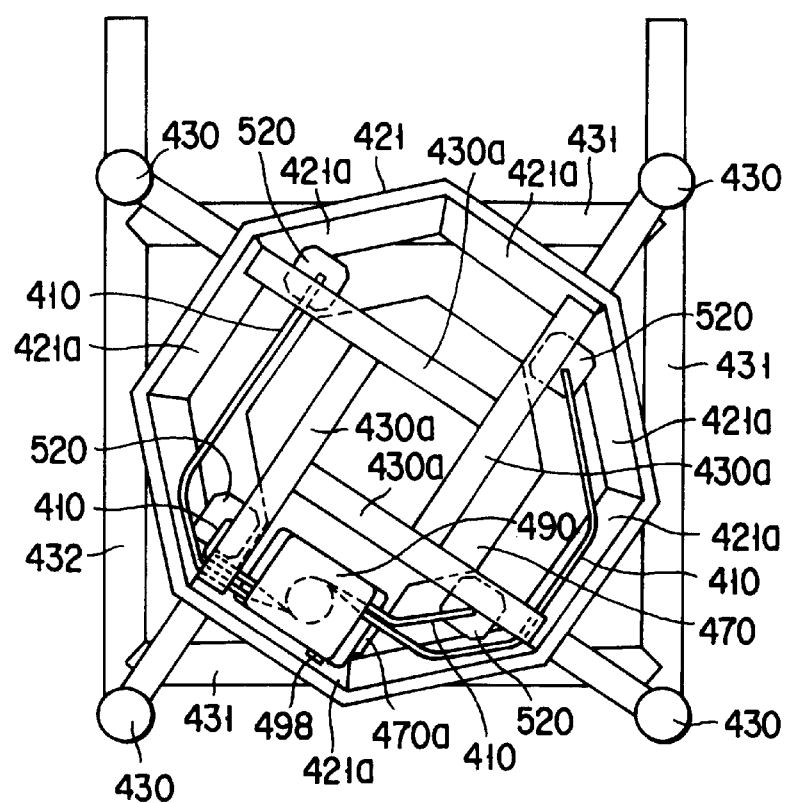
FIG. 23 is a plan view showing a main portion of the combination weighing apparatus in accordance with the fourth embodiment of the present invention.

As shown in FIG. 23, respective horizontal portions 430a, 430a, . . . having a hollow rectangular cross section disposed at upper ends of four vertical supporting columns 430, 430, . . . are inserted to the side walls 421a of the main body 421 in the casing 420, and are fixed by the inserting portions, whereby the main body 421 are supported by four supporting columns 430, 430, . . . .

Four horizontal portions 430a, 430a, . . . mentioned above are connected and fixed to each other so as to vertically cross to each other in a # shape at the center of the main body 21.

The lower portions of four supporting columns 430, 430, . . . are connected and fixed to each other by the horizontal frames 431, 431, . . . .

An upper lid 440 is mounted to an upper surface opening portion of the main body 421.

An outer peripheral edge portion 442 is protruded downward in an outer periphery of a polygonal plate portion 441 of the upper lid 440 so as to surround an upper end of the main body 421 at a slight interval.

An engagement hook 443 is provided in the outer peripheral edge portion 442 of the upper lid 440 at a plurality of portions.

An engagement operating device 444 for engaging the engagement hook 443 is provided at an upper end of the peripheral wall portion 422 of the casing main body 421.

It is possible to lift up the casing 440 from the casing main body 421 so as to take out by operating the engagement operating device 444 so as to take out the engagement hook 443.

A spherical portion 445 expanding upward so as to form a spherical shape is provided in a center of the plate portion 441 of the upper lid 440.

A circular hole 446 is provided in a center of the spherical portion 445, and a plurality of circular holes 447, 447, . . . are provided in the plate portion 441 in the outer periphery of the spherical portion 445 in a circumferential direction at a uniform interval.

A polygonal plate-like base plate 450 is fixed to upper surfaces of the horizontal portions 430a, 433a, . . . in four supporting columns 430, 430, . . . bonded so as to form a cross shape within the main body 421 by a suitable means such as a welding or the like.

In correspondence to the center hole 446 of the upper lid 440, a rotation driving motor 451 is mounted to a center upper surface of the base plate 450.

A rotary shaft 451a of the rotation driving motor 451 protrudes upward from the center hole 446 of the upper lid 440.

A circular bevel-shaped dispersion table 452 is detachably mounted to an upper end of the rotary shaft 451a.

Accordingly, the dispersion table 452 integrally rotates with the rotary shaft 451a.

In correspondence to the respective holes 447 arranged at the uniform interval in a cylindrical direction of the plate portion 441 of the upper lid 440, vibrating devices 453 are respectively mounted on the upper surface of the base plate 450 side by side in a circumferential direction.

A vibration shaft 453a of each of the vibrating devices 453 protrudes upward from each of the holes 447 of the plate portion 441 in the upper lid 440.

Further, a plurality of radial feeders 454 (in the drawing, only one in a right side is illustrated) receiving the subject to be weighed which is dropped and supplied from the center dispersion table 452 are detachably mounted to the upper ends of the respective vibration shaft 453a.

The subject to be weighed which is dropped and supplied to the respective radial feeders 454 from the dispersion table 452 sequentially moves to the external portion in the radial direction due to the vibration of the respective radial feeders 454 and drops down from the front end thereof.

Circular arm insertion holes 455 and 456 arranged in correspondence to the respective radial feeders 454, 454, . . . at a uniform interval in a circumferential direction in upper and lower sides from the horizontal portions 430a, 430a, . . . of the supporting columns 430, 430, . . . are provided in upper and lower stages in the respective wall portions 421a of the main body 421.

In correspondence to the respective upper arm insertion holes 455, an arm supporting plate 457 is stood from an upper surface of the base plate 450.

A hollow hopper supporting arm 458 for supporting the stock hopper 460 and opening and closing the lid is fixed to an outer surface of each of the arm supporting plate 457 so as to radially protrude from each of the arm insertion holes 455 of the casing main body 421.

A rubber packing 462 is mounted to a gap between the arm insertion hole 455 and the hopper supporting arm 458.

An opening and closing operation driving motor 461 for driving a driving lever protruding from the hollow hopper supporting arm so as to open and close the opening and closing lid of the of the stock hopper 460 is mounted to an inner surface of each of the arm supporting plate 457.

Figure 22:
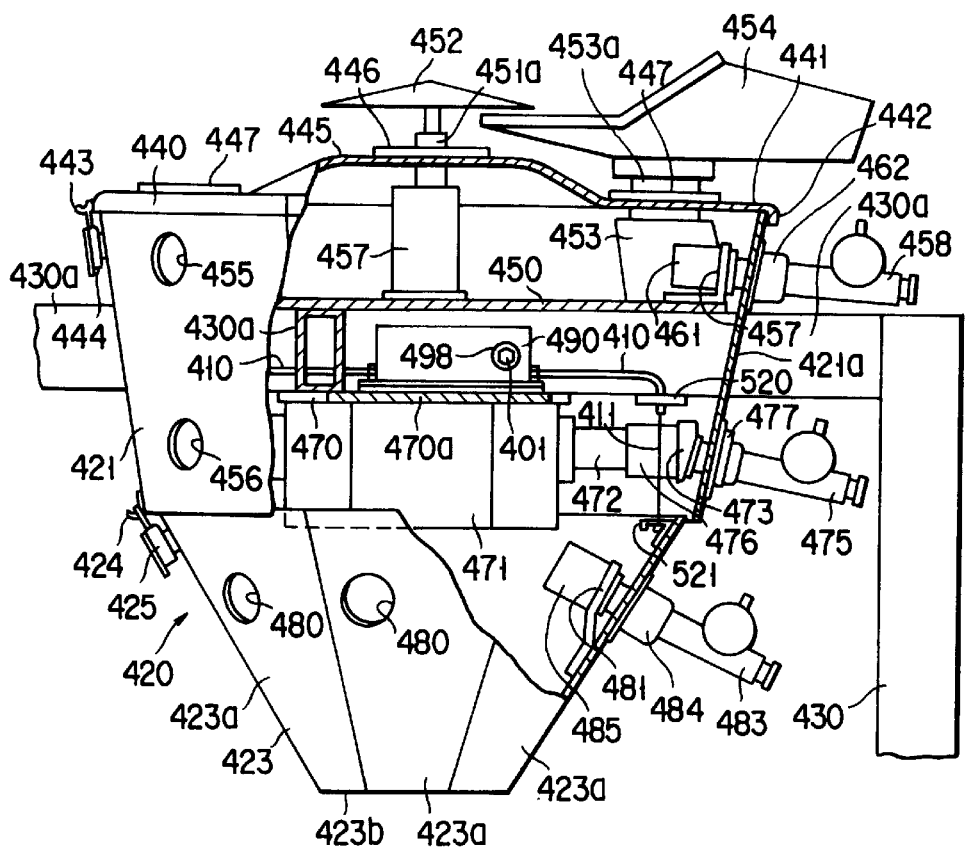
FIG. 22 is a front elevational view showing in a state of breaking a main portion of the combination weighing apparatus in accordance with the fourth embodiment of the present invention.

As shown in FIGS. 22 and 23, a polygonal plate-like base plate 470 is fixed to lower surfaces of the horizontal portions 430a, 430a, . . . of four supporting columns 430, 430, . . . bonded so as to form a cross shape within the casing main body 421 by a suitable means such as a welding or the like.

A weighing device supporting table 471 is fixed to a center of a lower surface in the base plate 470.

A plurality of load cells (weighing devices) 472 are mounted to an outer surface of the weighing device supporting table 471 in correspondence to the lower respective arm insertion holes 456 in a cantilever manner.

The arm supporting plate 473 is fixed to a free end of each of the load cells (the weighing devices) 472.

A hollow hopper supporting arm 475 for supporting the weighing hopper 474 and opening and closing the opening and closing lid is fixed to the outer surface of the arm supporting plate 473 so as to radially protrude outward from each of the lower arm insertion holes 456.

An opening and closing operation driving motor 476 for driving the drive lever from which the hopper supporting arm 475 protrudes is mounted to an inner surface of the arm supporting plate 473.

In this case, in order to prevent the subject to be weighed and the water at a time of cleaning from entering from the gap between the lower arm insertion hole 456 and the hopper supporting arm 475, a rubber packing 477 is fixed.

The rubber packing 477 is structured such as not to prevent the hopper supporting arm 475 from moving due to insertion or discharge of the subject to be weighed with respect to the weighing hoppers 474.

Arm insertion holes 480, 480, . . . are provided in the respective side walls 423a of the bottom plate body (the second separated casing) 423 side by side in a circumferential direction.

A hollow hopper supporting arm 483 for supporting a memory hopper 482 and opening and closing a lid thereof is fixed to an outer surface of an arm supporting plate 481 fixed to an inner surface of the side wall 423a of the bottom plate body 423 so as to radially protrude outward from each of the arm insertion holes 480, 480, . . . .

A rubber packing 484 is mounted to a gap between the hopper supporting arm 483 and the arm insertion hole 480.

An opening and closing operation driving motor 485 for driving a drive lever protruding out from the hollow hopper supporting arm 483 is mounted to an inner surface of each of the arm supporting plates 481.

Engagement hooks 424 are provided on the lower end outer surface of the casing main body 421 at a plurality of portions in the circumferential direction of the casing main body 421.

An engagement operating device 425 engaging the engagement hook 424 is provided on an outer surface of an upper end of the bottom plate body 423.

As shown in FIG. 22, the bottom plate body 423 is fixed to the casing main body 421 in a state that the upper end of the bottom plate body 423 is received inside the opening portion of the lower end of the casing main body 421 with a slight gap by engaging the engagement hook 424 by the engagement operating device 425.

Further, the engagement operating device 425 is operated so as to be taken out from the engagement hook 424, whereby the bottom plate body 423 can be moved downward or upward by a winch unit 490 corresponding to a vertically moving apparatus from the casing main body 421.

As shown in FIGS. 22 and 23, a protruding portion 470*a* is provided in the polygonal plate-like base plate 470 within the casing main body 421.

The winch unit 490 corresponding to the vertically moving apparatus is mounted to an upper surface of the protruding portion 70*a*.

Figure 24:
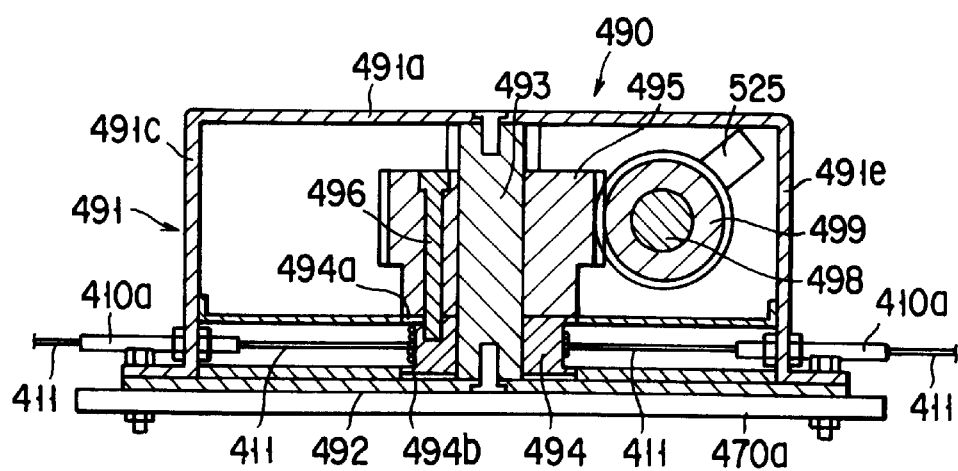
FIG. 24 is a vertical cross sectional view showing a winch unit of the combination weighing apparatus in accordance with the fourth embodiment of the present invention.
Figure 25:
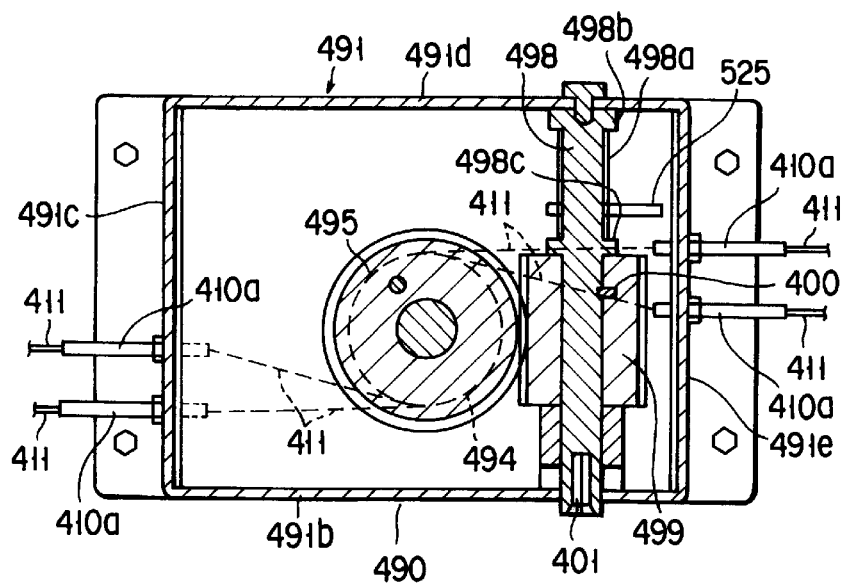
FIG. 25 is a horizontal cross sectional view showing the winch unit of the combination weighing apparatus in accordance with the fourth embodiment of the present invention.

The winch unit 490 corresponding to the vertically moving apparatus is, as shown in FIGS. 24 and 25, provided with a rectangular box-like case 491 constituted by an upper plate 491*a* and four side surfaces 491*b*, 491*c*, 491*d* and 491*e* and having an open bottom surface, and a bottom plate 492 attached so as to close the open surface.

A vertical shaft 493 is fixed to a portion between the bottom plate 492 and the upper plate 491*a* of the case 491.

A bobbin 494 and a worm wheel 495 are respectively mounted in a lower end side and an upper portion of the shaft 493 so as to freely rotate.

Further, the bobbin 494 and the worm wheel 495 are connected to each other by a pin 496 so as to integrally rotate.

A horizontal rotary shaft 498 is mounted vertical to two opposing side plates 491*b* and 491*d* in the case 491 so as to freely rotate.

A worm 499 engaged with the worm wheel 495 is connected to the rotary shaft 498 by a pin 400 so as to integrally rotate with the rotary shaft 498.

One end of the rotary shaft 498 protrudes forward from the hole in the side plate 491*b* in a front surface side of the case 491.

A hexagonal operating hole 401 is pierced along a center of the shaft from a front end surface of the rotary shaft 498.

An operating hole 402 is provided in the side wall 421*a* of the casing main body 421 of the casing 420 in correspondence to the protruding rotary shaft 498.

A nut 403 is fixed to an inner side of the operating hole 402 and the operating hole 402 is normally closed for the purpose of waterproofing by engaging a screw lid 404 with a nut 403 from an outer side.

The screw lid 404 is taken out and a hexagonal column-like front end portion of a T-head wrench or the like is inserted to the hexagonal operating hole 401 of the rotary shaft 498 in the winch unit 490 so as to rotate the rotary shaft 498.

Accordingly, it is possible to rotate the bobbin 494 via the worm 499 and the worm wheel 495.

Two holes are provided in each of positions corresponding to the bobbin 494 in the lower portion of two opposing side plates 491*c* and 491*e* in the case 491.

One end 410*a* of a wire tube 410 is fixed to each of the holes.

Figure 27:
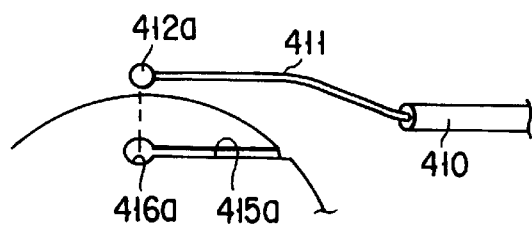
FIG. 27 is a perspective view showing a relation between a bobbin and a wire end portion of the combination weighing apparatus in accordance with the fourth embodiment of the present invention.

As shown in FIG. 27, a wire 411 is inserted within the wire tube 410.

A spherical body 412*a* is fixed to one end of the wire 411.

Circular flanges 494*a* and 494*b* are provided at upper and lower ends in the bobbin 494.

Figure 28:
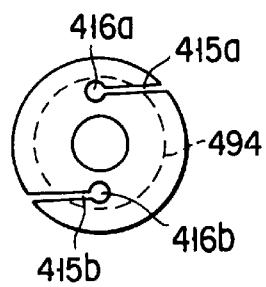
FIG. 28 is a plan view showing a bobbin of the combination weighing apparatus in accordance with the fourth embodiment of the present invention.
Figure 29:
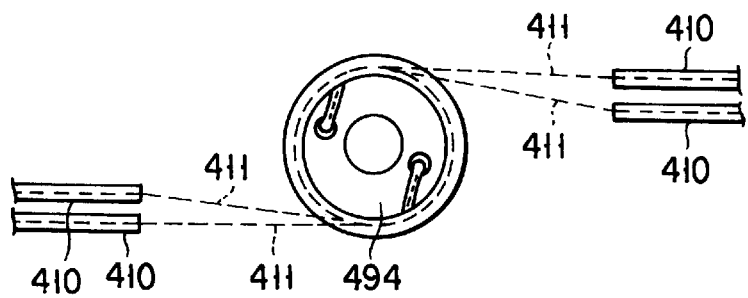
FIG. 29 is a plan view showing a relation between the bobbin and the wire end portion of the combination weighing apparatus in accordance with the fourth embodiment of the present invention.

Further, as shown in FIGS. 27 to 29, two long grooves 415*a* and 415*b* are provided in linear directions parallel to each other shifted from a center of the bobbin 494 in a vertical direction from one flange.

Circular grooves 416*a* and 416*b* are provided at front ends of the respective long grooves 415*a* and 415*b* so as to prevent the wire 411 from being taken out in accordance that the spherical bodies 412*a* and 412*a* at the front ends of the respective wires 411 and 411 are fitted thereto.

End portions of two wires 411 and 411 wound around the bobbin 494 through two wire tube end portions 410*a* and 410*a* in a side of one side plate 491*e* are received in one long groove 415*a*, and the spherical bodies 412*a* and 412*a* are fitted to the circular groove 116*a* so as to be fitted thereto.

Further, the end portions of two wires 411 and 411 in which two wire tube end portions 410*a* and 410*a* in a side of another side plate 491*c* are wound around the bobbin 494 are received in another long groove 415*b*, and the spherical bodies 412 are fitted to the circular grooves 416*b* so as to be fitted thereto.

Figure 30:
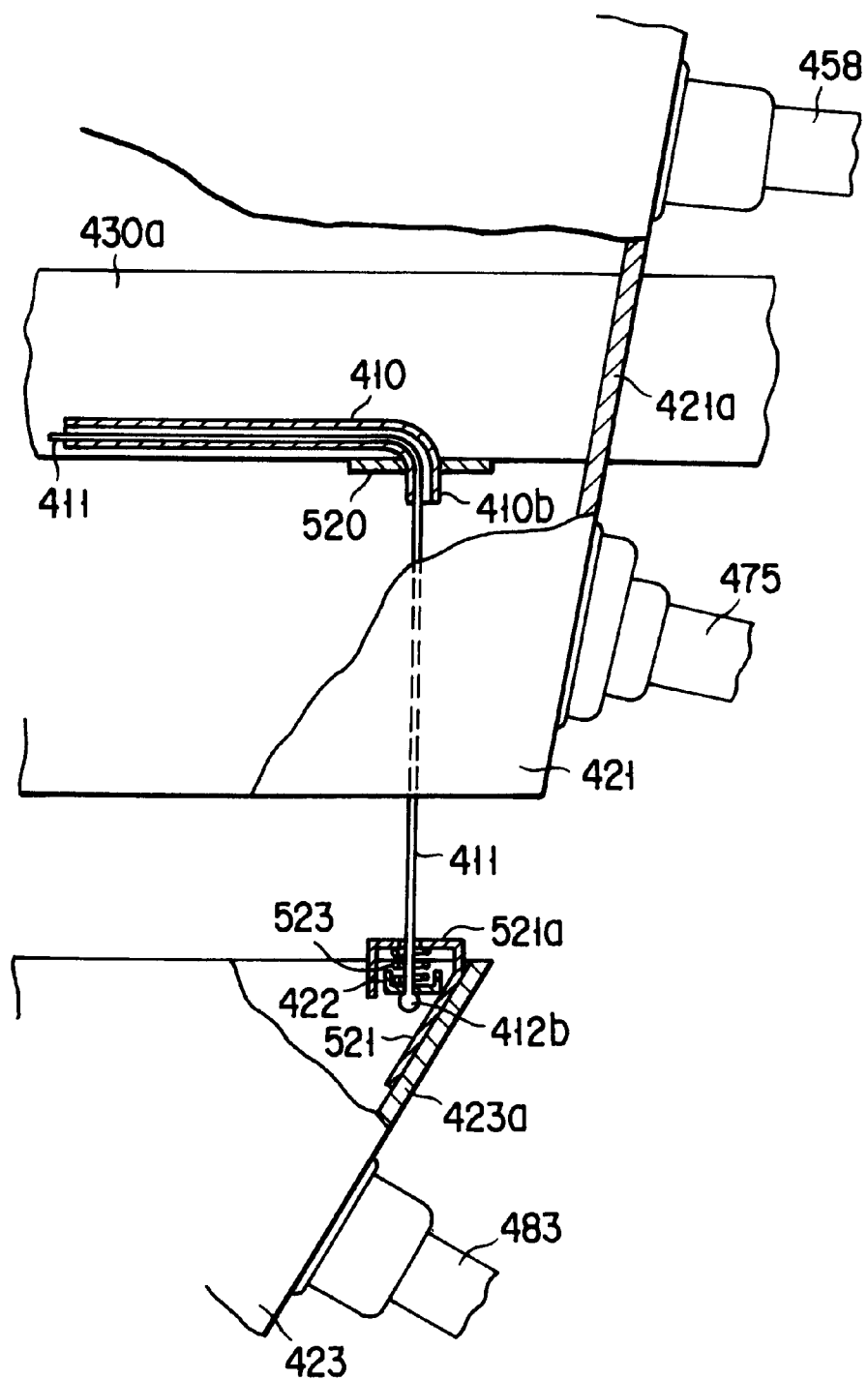
FIG. 30 is a front elevational view showing in a state of breaking a main part, which shows a suspending state executed by the wire in the combination weighing apparatus in accordance with the fourth embodiment of the present invention.

As shown in FIGS. 23 and 30, wire tube fixing plates 520, 520, . . . are respectively fixed to lower surfaces of respective horizontal portions 430*a*, 430*a*, . . . in four supporting columns 430, 430, . . . .

Another end 410*b* of each of the wire tubes 410 is fixed to a hole of each of the wire tube fixing plates 520, 520, . . . .

The wire tube 410 is constituted by a rigid body which is not bent due to a weight of the bottom plate body or the like.

The wire 411 within the wire tube 410 is inserted along the curve of the wire tube 410.

In this case, in the case that the wire tube 410 employs a structure which is not rigid, the structure may be made such that the wire tube 410 is wired in a polygonal line shape from the winch case 491 to the wire tube fixing plate 520, a roller (not shown) is rotatably provided in the side wall 421*a* of the casing main body 421 and the horizontal portion 430*a* in each of the supporting columns, and the bent portion is supported by the roller.

As shown in FIG. 30, four wire angles 521 are fixed to an inner surface of the side wall 423*a* at the upper end of the bottom plate body 423 in correspondence to each of the wire tube fixing plate 520.

A wire insertion hole is provided in a horizontal portion 521*a* of the wire angle 521.

The lower end of the wire 411 suspended downward in a vertical direction from the wire tube end portion 410*b* of the wire tube fixing plate 520 is inserted downward from the wire insertion hole.

The spherical body 412*b* is fixed to the lower end of the wire 411.

A U-shaped stopper 422 is provided at the lower end of the wire 411 so that the spherical body 412*b* is not taken out.

Further, a coil spring 523 is provided so that the lower end of the wire 411 passes within the coil spring 523 in a state that the lower end portion is in contact with the stopper 422 and the upper end portion is in contact with a lower surface of a horizontal portion 521*a* of the wire angle 521.

As mentioned above, the coil spring (the urging means) 523 is provided at each of the lower ends of four wires 411 in such a manner as to be in contact with a portion between the stopper 422 and the horizontal portion 521*a* of the wire angle 521.

Accordingly, it is possible to absorb a dispersion of a suspension tension between four wires 411, 411, . . . in a state of suspending down the bottom plate body 423 by four wires 411, 411, . . . , and reduce an impact applied to four wires 411, 411, . . . immediately after stopping suspending down.

Accordingly, it is possible to move downward the bottom plate body 423 by taking out the engagement hook 424 from the engagement operating device 425, rotating the rotary shaft 498 of the winch unit 490 by the wrench and winding down four wires 411, 411, . . . wound around the bobbin 494.

Further, it is possible to move upward the bottom plate body 423 by rotating the rotary shaft 498 in a backward direction by the wrench.

In this case, as shown in FIGS. 24 and 25, the screw surface 498a is provided in a side of the side plate 491d rather than the worm 499 of the rotary shaft 498.

Further, a long plate nut 525 is engaged with one side of the screw surface 498a.

Accordingly, when rotating the rotary shaft 498 in one direction by the wrench, a front end of the plate nut 525 is in contact with an upper plate 491a or a side plate 491e, and can not be rotated.

Accordingly, the plate nut (a restricting body) 525 gradually moves to any one side along the rotary shaft 498 so as to be in contact with a step portion 498b or 498c of the rotary shaft 498.

Accordingly, it is impossible to rotate the rotary shaft 498 by the wrench any more.

Accordingly, it is possible to restrict so that the bottom plate body 423 can not move downward and upward over a predetermined distance.

Figure 21:
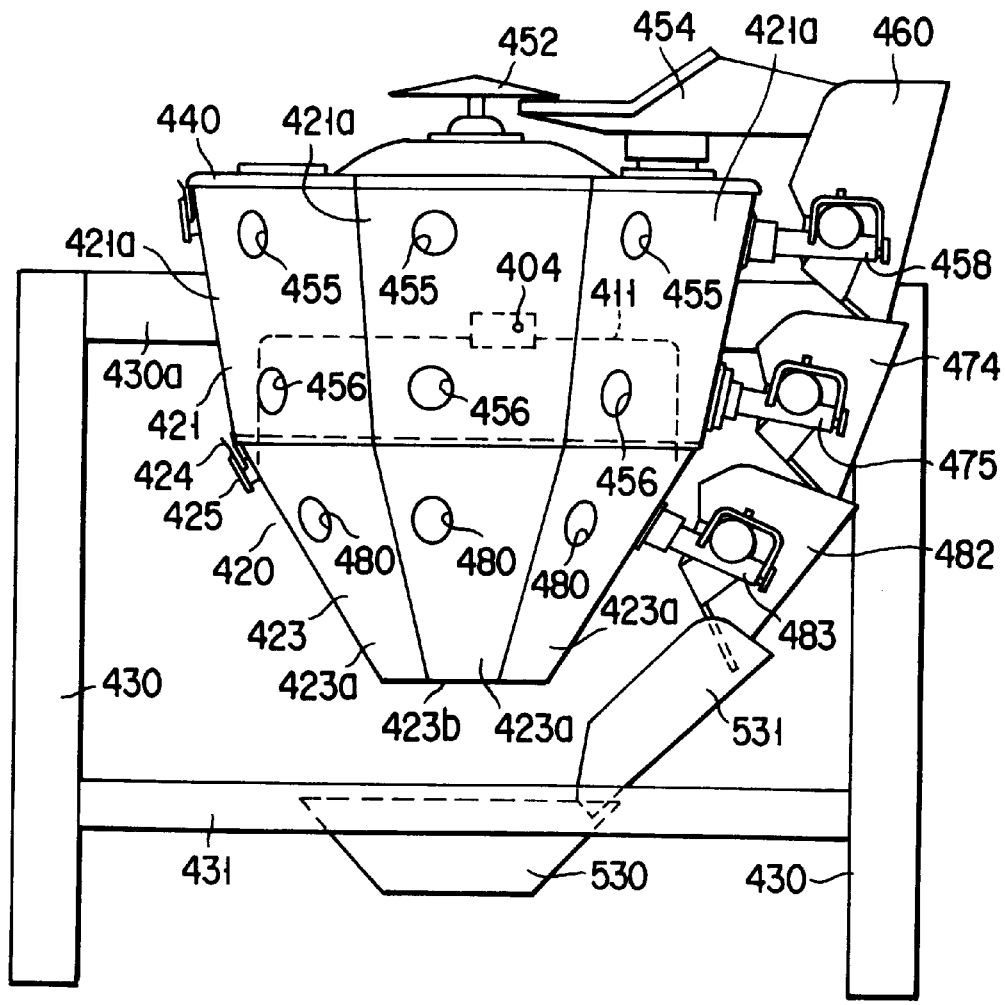
FIG. 21 is a schematic front elevational view showing the combination weighing apparatus in accordance with the fourth embodiment of the present invention.

As shown in FIG. 21, the stock hopper 460, the weighing hopper 474 and the memory hopper 482 are detachably mounted to the hopper supporting arms 458, 475 and 483, respectively.

Further, the subject to be weighed which drops from the front end of the radial feeder 454 is supplied to the stock hopper 460.

Further, the subject to be weighed which drops from the stock hopper 460 is supplied to the weighing hopper 474.

Further, the subject to be weighed which drops from the weighing hopper 474 is supplied to the memory hopper 482.

A circular funnel-shaped collecting chute 530 is mounted below the casing 420 by the horizontal frames 431, 431, . . . .

Further, a guide chute 531 is detachably mounted to each of the memory hoppers 482.

Further, the subject to be weighed which is supplied from a plurality of memory hoppers 474, . . . selected for the combination drops to the collecting chute 530 through the guide chute 531 (in this case, only right side one hopper supporting arm, hopper, guide chute, and the like are shown).

Owing to the above structure, it is possible to maintain, inspect and replace the motor 451, the motor 461 and the vibrating device 453 within the casing main body 421 from the upper end opening portion of the casing main body 421 by taking out the dispersion table 452 and the radial feeder 454, taking out the engagement operating device 444 from the engagement hook 454 and taking out the upper lid 440 from the casing main body 421 of the casing 420.

Figure 26:
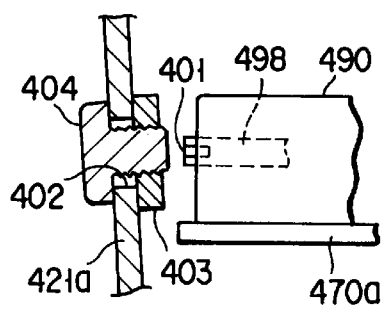
FIG. 26 is a cross sectional view showing a main portion of a rotary shaft operation of the combination weighing apparatus in accordance with the fourth embodiment of the present invention.

Further, it is possible to maintain, inspect and replace the weighing device 472, the motor 476 and the like within the casing main body 421 from the lower end opening portion of the casing main body 421 by taking out at least the guide chute 531 (refer to FIG. 21), taking out the engagement operating device 425 from the engagement hook 424, taking out the screw lid 404 (refer to FIGS. 20, 21 and 26) and inserting the wrench to the operating hole of the rotary shaft 498 in the winch unit 490 so as to rotate the rotary shaft 498, thereby moving downward the bottom plate body 423.

Further, in accordance with the structure mentioned above, it is possible to maintain, inspect and replace the motor 485 and the like within the bottom plate body 423 from the upper end opening portion of the bottom plate body 423.

Fifth Embodiment

In the fourth embodiment mentioned above, there is exemplified the structure in which the lower side separated casing is suspended down from the upper side separated casing so as to be vertically moved.

Figure 31:
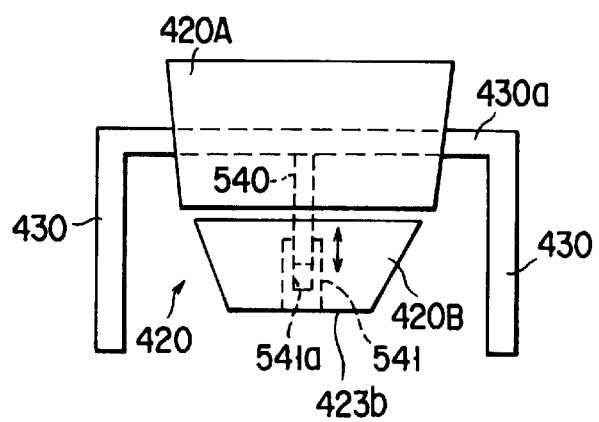
FIG. 31 is a schematic view showing a combination weighing apparatus in accordance with a fifth embodiment of the present invention.

On the contrary, in the fifth embodiment, as shown in FIG. 31, a shaft 540 is suspended downward from the horizontal portion 430a of the supporting column 430 within the upper side separated casing 420A so as to vertically move the lower side separated casing 420B along the shaft 540.

For example, the structure may be made such that a receiving shaft 541 is protruded upward from the bottom plate 423b and the shaft 540 is slidably fitted to a hole 541a of the receiving shaft 541.

Sixth Embodiment

Figure 32:
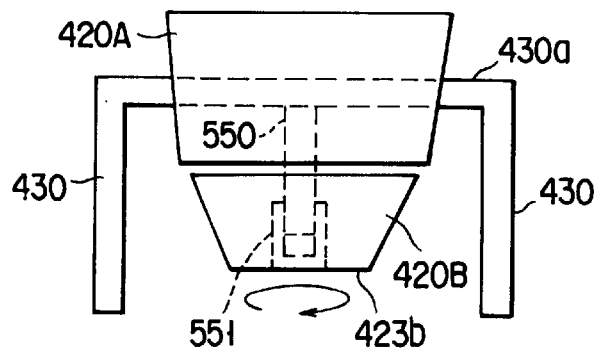
FIG. 32 is a schematic view showing a combination weighing apparatus in accordance with a sixth embodiment of the present invention.

Further, in a sixth embodiment, as shown in FIG. 32, a circular column 550 having a screw surface on an outer periphery thereof is suspended downward from the upper side separated casing 420A, and the lower side separated casing 420B is engaged with the circular column 550 so as to rotate the lower side separated casing 420B, thereby opening the casing vertically.

For example, the structure may be made such that a pipe 551 having an internal screw surface protruding upward from the bottom plate 423b of the lower side separated casing 420B is engaged with the circular column 550 so as to vertically move along the circular column 550 due to rotation.

Seventh Embodiment

In the fourth to sixth embodiments, there is exemplified a case that the casing 420 is vertically separated into two portions.

Figure 33:
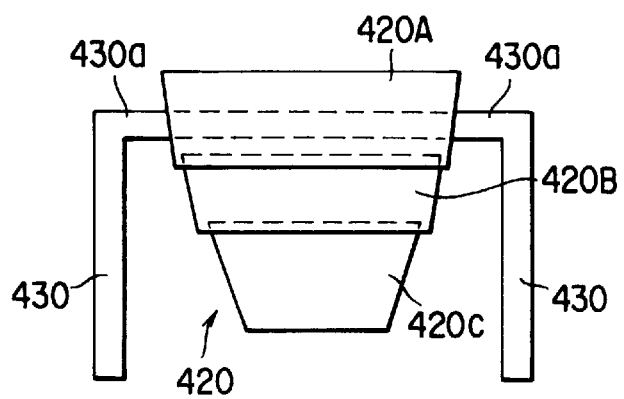
FIG. 33 is a schematic view showing a combination weighing apparatus in accordance with a seventh embodiment of the present invention.
Figure 34:
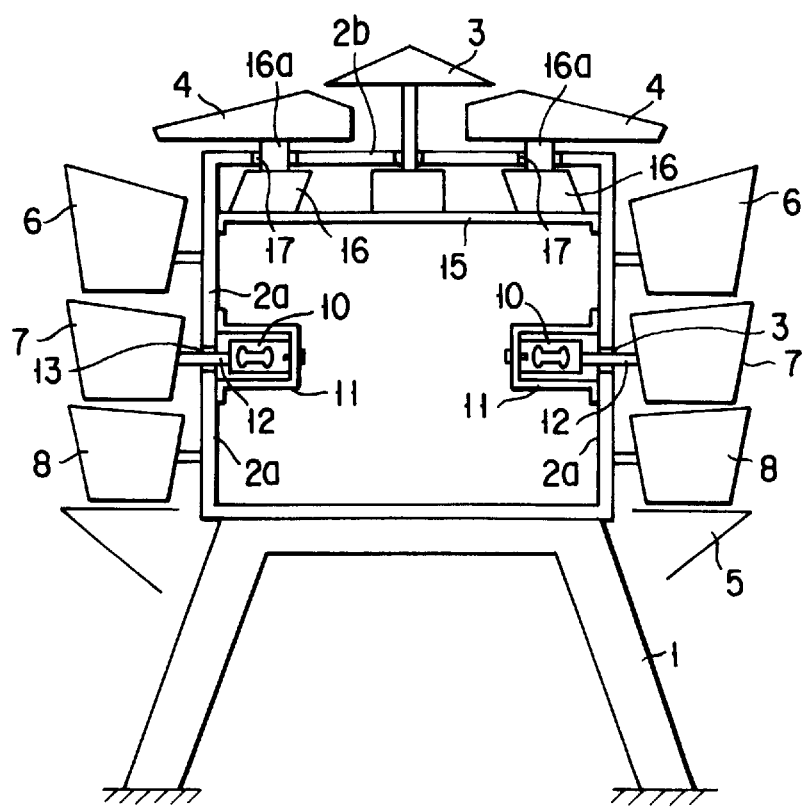
FIG. 34 is a front elevational view showing a main portion of a conventional combination weighing apparatus.
Figure 35:
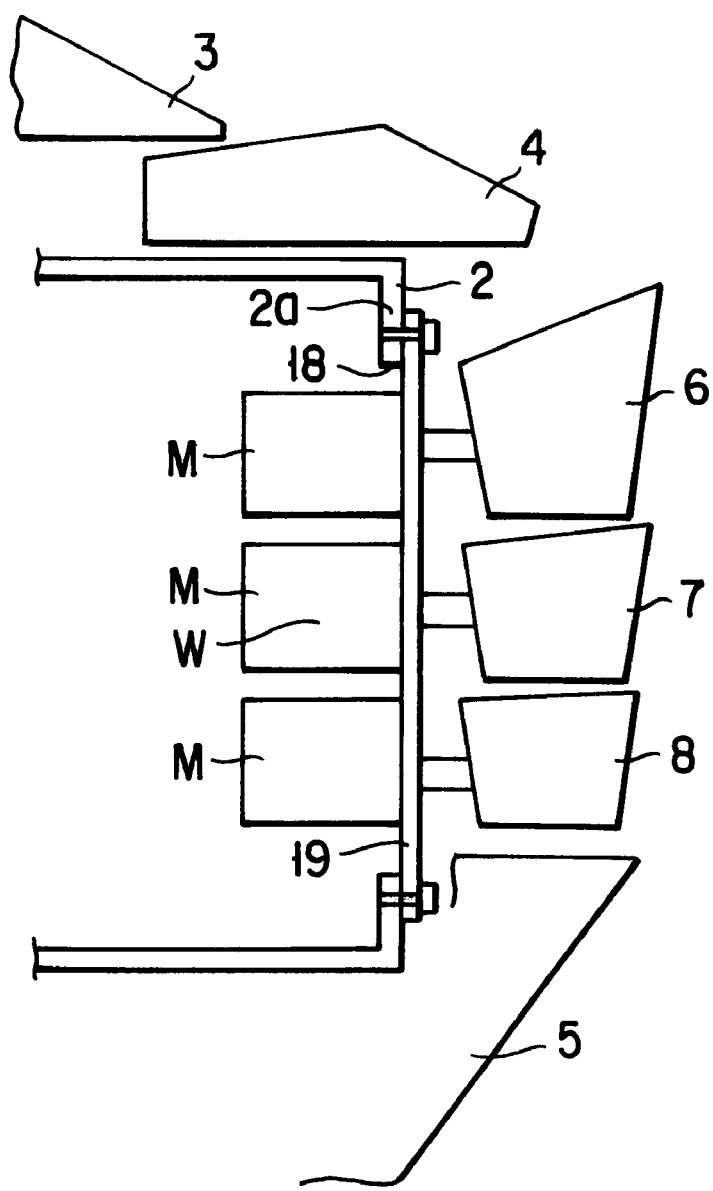
FIG. 35 is a front elevational view showing the main portion of the conventional combination weighing apparatus.

On the contrary, in this seventh embodiment, as shown in FIG. 33, the casing is vertically separated into three portions 420A, 420B and 420C.

In this case, the casing 420 may be vertically separated into three or more portions.

As mentioned above, the combination weighing apparatus in accordance with the fourth embodiment of the present invention is structured such that in the combination weighing apparatus provided with a plurality of hoppers along the outer periphery of the casing, the casing is vertically separated into at least two portions, one separated casing is fixed to the supporting column, and the other separated casings can be vertically moved by the vertically moving apparatus so as to open and close between the upper side separated casing and the lower side separated casing.

Since the casing is structured such as to be vertically separated and vertically move so as to open and close therebetween, it is possible to take in and out the drive source and the weighing device within the casing from the vertically separated opening surface of the casing, so that it is not necessary to provide the hole having a large size for taking and out the drive source and the weighing device in the casing itself, and it is sufficient to provide with a significantly small hole through which the lever for opening and closing the opening and closing lid passes.

Accordingly, since it is not necessary to attach the mounting plate for closing the large hole and the structure is made simple, the attachment and accumulation of the subject to be weighed is reduced and it is possible to improve in view of sanitation, and further, a waterproof property at a time of cleaning is significantly improved.

Further, since it is unnecessary to execute a troublesome operation such as the attachment and detachment of the mounting plate and the like at a time of inspecting and maintaining the drive source, the weighing device and the like within the casing, and it is sufficient to vertically move the separated casings in a simple manner, the inspection and the maintenance can be executed in a significantly easy manner.

Further, the combination weighing apparatus in accordance with the fourth embodiment of the present invention is structured such that in the combination weighing apparatus provided with a plurality of hoppers along the outer periphery of the casing, the casing is vertically separated into at least two portions, the lower side separated casing is suspended down and supported by the wire from the upper side separated casing and vertically moved by the winch provided in the upper side separated casing so as to open and close between the upper side separated casing and the lower side separated casing.

Accordingly, it is possible to open and close the separated casings in a significantly easy manner by winding up and down the lower side separated casing suspended down by the wire by means of the winch.

Further, in the combination weighing apparatus in accordance with the fourth embodiment of the present invention, the lower end portions of a plurality of wires suspending down and supporting the lower side separated casing are respectively attached to the lower side separated casing via the urging means.

Accordingly, an individual difference of a tensile force applied by a plurality of wires suspending down the lower side separated casing is absorbed by the urging means provided at the lower end of each of the wires.

Further, an impact at a time of stopping winding up and down by the winch is also absorbed.

Further, in the combination weighing apparatus in accordance with the fourth embodiment of the present invention, the structure is made such that the hole for operation is provided in the upper side casing, and the lower side casing can be vertically moved by inserting the operating device from the hole and operating the winch.

Accordingly, it is possible to vertically open and close the casing in a simple manner from the external portion.

Further, in the combination weighing apparatus in accordance with the fourth embodiment of the present invention, the structure is made such that the winch is provided with the rotary shaft rotating on the basis of the operation applied from the external portion, and the moving body moving in an axial direction of the rotary shaft in correspondence to the amount of rotation of the rotary shaft, and the restricting body for restricting the moving range of the moving body is provided so as to restrict the wind-up amount or the wind-down amount executed by the winch.

Accordingly, the wind-up and wind-down ranges of the lower side separated casing executed by the winch are automatically determined.

Further, the combination weighing apparatus in accordance with the fifth embodiment of the present invention is structured such that in the combination weighing apparatus provided with a plurality of hoppers along the outer periphery of the casing, the casing is vertically separated into at least two portions, the shaft is protruded downward from the upper side separated casing, and the lower side separated casing is mounted along the shaft in such a manner as to vertically move so as to open and close between the upper side separated casing and the lower side separated casing.

Accordingly, it is possible to easily open and close the casing by vertically moving the lower side separated casing along the shaft and it is easy to inspect and maintain the drive source and the weighing device within the casing.

Further, the combination weighing apparatus in accordance with the sixth embodiment of the present invention is structured such that in the combination weighing apparatus provided with a plurality of hoppers along the outer periphery of the casing, the casing is vertically separated into at least two portions, the circular column provided with the screw surface is protruded downward from the upper side separated casing, and the lower side separated casing is engaged with the circular column and rotated so as to vertically move along the circular column, thereby opening and closing between the upper side separated casing and the lower side separated casing.

Accordingly, it is possible to easily open and close the casing by rotating the lower side separated casing so as to be vertically movable along the circular column and it is easy to inspect and maintain the drive source and the weighing device within the casing.

What is claimed is:

1. A combination weighing apparatus comprising:
    a plurality of feeders supplying a subject to be weighed;
    a plurality of weighing hoppers receiving said subject to be weighed which is supplied by said plurality of feeders;
    a plurality of weighing devices for weighing the subject to be weighed which is received in said weighing hoppers;
    a weighing device base to which said plurality of weighing devices are fixed; and
    a stand constituted by a plurality of metal supporting columns provided at a predetermined interval in a circumferential direction, having leg portions standing up from placing surfaces and supporting portions including horizontal portions connected to said leg portions and said horizontal portions of the supporting portions being connected to each other at a center portion,
    wherein said weighing device base is directly fixed to a lower surface of said center portion of said stand.

2. A combination weighing apparatus according to claim 1, wherein said weighing device base is a hollow tube body, said plurality of weighing devices are fixed to an outer peripheral portion of said hollow tube body, and a wiring path for said plurality of weighing devices is provided in an inner portion of said hollow tube body.

3. A combination weighing apparatus according to claim 1, wherein a vibration sensor commonly used for compensating for the vibrations of said plurality of weighing devices is mounted to said weighing device base.

4. A combination weighing apparatus according to claim 1, further comprising a side surface cover integrally formed so as to surround said weighing device base portion in a circumferential direction.

5. A combination weighing apparatus according to claim 1, further comprising:
    a plurality of memory hoppers receiving the subject to be weighed which is weighed by said weighing hoppers;
    a first side surface cover integrally formed so as to surround at least said weighing device base portion in a circumferential direction; and
    a second side surface cover integrally formed so as to surround at least a driving portion opening and closing a lid of a discharge port in said memory hopper in a circumferential direction,
    wherein said first and second side surface covers are formed so as to be respectively separated into at least two in a vertical direction.

6. A combination weighing apparatus comprising:

a plurality of feeders supplying a subject to be weighed;

a feeder base to which said plurality of feeders are fixed;

a plurality of weighing hoppers receiving said subject to be weighed which is supplied by said plurality of feeders;

a plurality of weighing devices for weighing the subject to be weighed which is received in said weighing hoppers;

a weighing device base to which said plurality of weighing devices are fixed; and a stand constituted by a plurality of metal supporting columns provided at a predetermined interval in a circumferential direction, having leg portions standing up from placing surfaces and supporting portions including horizontal portions connected to said leg portions and said horizontal portions of the supporting portions being connected to each other at a center portion, wherein said feeder base is directly fixed to an upper surface of a center connecting portion of said stand, and said weighing device base is directly fixed to a lower surface of said center portion of said stand.

7. A combination weighing apparatus according to claim 6, wherein said weighing device base is a hollow tube body, said plurality of weighing devices are fixed to an outer peripheral portion of said hollow tube body, and a wiring path for said plurality of weighing devices is provided in an inner portion of said hollow tube body.

8. A combination weighing apparatus according to claim 6, wherein a vibration sensor commonly used for compensating for the vibrations of said plurality of weighing devices is mounted to said weighing device base.

9. A combination weighing apparatus according to claim 6, further comprising a side surface cover integrally formed so as to surround said weighing device base portion in a circumferential direction.

10. A combination weighing apparatus according to claim 6, further comprising:

a plurality of memory hoppers receiving the subject to be weighed which is weighed by said weighing hoppers;

a first side surface cover integrally formed so as to surround at least said weighing device base portion in a circumferential direction; and a second side surface cover integrally formed so as to surround at least a driving portion opening and closing a lid of a discharge port in said memory hopper in a circumferential direction, wherein said first and second side surface covers are formed so as to be respectively separated into at least two in a vertical direction.

11. A combination weighing apparatus comprising:

a plurality of feeders supplying a subject to be weighed;

a feeder base to which said plurality of feeders are fixed;

a plurality of stock hoppers receiving said subject to be weighed which is supplied by said plurality of feeders;

a stock hopper base to which said plurality of stock hoppers are fixed;

a plurality of weighing hoppers receiving said subject to be weighed which is dropped down from said plurality of stock hoppers;

a plurality of weighing devices for weighing the subject to be weighed which is received in said weighing hoppers;

a weighing device base to which said plurality of weighing devices are fixed; and a stand constituted by a plurality of metal supporting columns provided at a predetermined interval in a circumferential direction, having leg portions standing up from placing surfaces and supporting portions including horizontal portions connected to said leg portions and said horizontal portions of the supporting portions being connected to each other at a center portion, wherein said feeder base and said stock hopper base are directly fixed to an upper surface of a center connecting portion of said stand, and said weighing device base is directly fixed to a lower surface of said center portion of said stand.

12. A combination weighing apparatus according to claim 11, wherein said weighing device base is a hollow tube body, said plurality of weighing devices are fixed to an outer peripheral portion of said hollow tube body, and a wiring path for said plurality of weighing devices is provided in an inner portion of said hollow tube body.

13. A combination weighing apparatus according to claim 11, wherein a vibration sensor commonly used for compensating for the vibrations of said plurality of weighing devices is mounted to said weighing device base.

14. A combination weighing apparatus according to claim 11, further comprising a side surface cover integrally formed so as to surround said feeder base, said stock hopper base and said weighing device base portion in a circumferential direction.

15. A combination weighing apparatus according to claim 11, further comprising:

a plurality of memory hoppers receiving the subject to be weighed which is weighed by said weighing hoppers;

a first side surface cover integrally formed so as to surround at least said feeder base, said stock hopper base and said weighing device base portion in a circumferential direction; and a second side surface cover integrally formed so as to surround at least a driving portion opening and closing an opening and closing lid of a discharge port in said memory hopper in a circumferential direction, wherein said first and second side surface covers are formed so as to be respectively separated into at least two in a vertical direction.

16. A combination weighing apparatus comprising:

a plurality of feeders supplying a subject to be weighed;

a plurality of weighing hoppers receiving said subject to be weighed which is supplied by said plurality of feeders;

a plurality of weighing devices for weighing the subject to be weighed which is received in said weighing hoppers;

a weighing device base to which said plurality of weighing devices are fixed;

a stand constituted by a plurality of metal supporting columns provided at a predetermined interval in a circumferential direction, having leg portions standing up from placing surfaces and supporting portions including horizontal portions connected to said leg portions and said horizontal portions of the supporting portions being connected to each other at a center portion;

a plurality of memory hoppers receiving a subject to be weighed which is weighed by said weighing hoppers;

a first side surface cover integrally formed so as to surround at least said weighing device base portion in a circumferential direction; and a second side surface cover integrally formed so as to surround at least a driving portion for opening and closing opening and closing lids in discharge ports of said memory hoppers in a circumferential direction, wherein said weighing device base is directly fixed to a lower surface of said center portion of said stand, and wherein said first and second side surface covers are respectively formed so as to be separated into at least two portions in a vertical direction, said first side surface cover is fixed to said plurality of supporting column portions of said stand, and said second side surface cover is structured such as to be vertically moved by an elevating apparatus so as to open and close between said first side surface cover disposed in an upper side and said second side surface cover disposed in a lower side.

17. A combination weighing apparatus according to claim 16, wherein said vertically moving apparatus suspends said second side surface cover disposed in the lower side from a side of said first side surface cover disposed in the upper side by a wire and vertically moves by a winch provided in a side of said first side surface cover disposed in the upper side so as to open and close between said first side surface cover disposed in the upper side and said second side surface cover disposed in the lower side.

18. A combination weighing apparatus according to claim 17, wherein lower end portions of said plurality of wires suspending and supporting said lower side second side surface cover are respectively mounted to said lower side second side cover via urging means.

19. A combination weighing apparatus according to claim 17, wherein a hole for operation is provided in said upper side first side surface cover, and said lower side casing can be vertically moved by inserting an operating device from said hole so as to operate said winch.

20. A combination weighing apparatus according to claim 19, wherein said winch is provided with a rotary shaft rotating in accordance with an operation from the external portion, provided with a moving body moving in an axial direction of the rotary shaft in correspondence to an amount of rotation of said rotary shaft, and provided with a restricting body restricting a moving range of said moving body so as to restrict a wind-up amount or a wind-down amount executed by said winch.

* * * * *

UNITED STATES PATENT AND TRADEMARK OFFICE
CERTIFICATE OF CORRECTION

PATENT NO. : 6,703,568 B2
DATED : March 9, 2004
INVENTOR(S) : Kazuyoshi Wako

It is certified that error appears in the above-identified patent and that said Letters Patent is hereby corrected as shown below:

<u>Title page,</u>
Item [73], Assignee, change "Anritsu Corporation, Tokyo (JP)" to -- Anritsu Industrial Solutions Co., Ltd., Atsugi-shi, Kanagawa (JP) --

Signed and Sealed this

Twenty-seventh Day of July, 2004

JON W. DUDAS
*Acting Director of the United States Patent and Trademark Office*